US009288169B2

United States Patent
Schaedler et al.

(10) Patent No.: US 9,288,169 B2
(45) Date of Patent: *Mar. 15, 2016

(54) METHODS, SYSTEMS, AND COMPUTER PROGRAM PRODUCTS FOR CLUSTERING AND COMMUNICATING BETWEEN INTERNET PROTOCOL MULTIMEDIA SUBSYSTEM (IMS) ENTITIES AND FOR SUPPORTING DATABASE ACCESS IN AN IMS NETWORK ENVIRONMENT

(71) Applicant: Tekelec, Inc., Morrisville, NC (US)

(72) Inventors: Richard E. Schaedler, Cary, NC (US); Robert L. Wallace, Apex, NC (US); Thomas L. Bonds, Jr., Raleigh, NC (US); Aziz Tejani, McKinney, TX (US); Peter Joseph Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 54 days.

This patent is subject to a terminal disclaimer.

(21) Appl. No.: 14/190,071

(22) Filed: Feb. 25, 2014

(65) Prior Publication Data

US 2014/0258423 A1    Sep. 11, 2014

Related U.S. Application Data

(60) Division of application No. 13/192,410, filed on Jul. 27, 2011, now Pat. No. 9,059,948, which is a continuation of application No. 11/303,757, filed on Dec. 16, 2005, now Pat. No. 8,015,293.

(60) Provisional application No. 60/637,337, filed on Dec. 17, 2004, provisional application No. 60/637,426, filed on Dec. 17, 2004.

(51) Int. Cl.
*G06F 15/16*    (2006.01)
*H04L 12/58*    (2006.01)
(Continued)

(52) U.S. Cl.
CPC .............. *H04L 51/043* (2013.01); *H04L 29/06* (2013.01); *H04L 29/12009* (2013.01);
(Continued)

(58) Field of Classification Search
CPC ... H04L 65/1016; H04L 51/043; H04L 41/00; H04L 61/1523; H04L 61/1576; H04L 61/1588; H04L 61/2539; H04L 67/306; H04L 69/306; H04W 8/20; H04W 60/00; H04W 8/04; H04W 8/12; H04W 64/00; H04W 8/06; H04W 80/00; H04W 80/10
USPC ........ 455/435.1; 370/338, 331, 252, 328; 1/1; 709/227, 206

See application file for complete search history.

(56) References Cited

U.S. PATENT DOCUMENTS 1,872,857 A    4/1931    Wesson et al.
5,535,373 A    7/1996    Olnowich
(Continued)

FOREIGN PATENT DOCUMENTS

CN    101483826 A    7/2009
CN    ZL 201080065174.6    6/2015
(Continued)

OTHER PUBLICATIONS

Decision to Grant for Chinese Patent Application No. 201080065174.6 (Apr. 16, 2015).
(Continued)

*Primary Examiner* — Jungwon Chang
(74) *Attorney, Agent, or Firm* — Jenkins, Wilson, Taylor & Hunt, P.A.

(57) ABSTRACT

Methods, systems, and computer program products for clustering and communicating between Internet protocol multimedia subsystem (IMS) entities and for supporting database access in an IMS network environment. According to one aspect, an IMS cluster node includes a serving call state control function (S-CSCF) for controlling media sessions between IMS users. The cluster node further includes a home subscriber service (HSS) function for storing and providing IMS subscription information to the S-CSCF function. A shared memory is operatively associated with the S-CSCF function and the HSS function. The S-CSCF function obtains IMS subscription information from the HSS function via the shared memory.

13 Claims, 14 Drawing Sheets

(51) Int. Cl.

| | | |
|---|---|---|
| *H04L 29/06* | (2006.01) | |
| *H04L 29/12* | (2006.01) | |
| *H04L 29/08* | (2006.01) | |
| *H04W 60/00* | (2009.01) | |
| *H04W 8/04* | (2009.01) | |
| *H04W 8/12* | (2009.01) | |
| *H04W 64/00* | (2009.01) | |
| *H04W 8/06* | (2009.01) | |
| *H04L 12/24* | (2006.01) | |
| *H04W 8/18* | (2009.01) | |
| *H04W 8/20* | (2009.01) | |
| *H04W 80/00* | (2009.01) | |
| *H04W 80/10* | (2009.01) | |

(52) U.S. Cl.
 CPC ... *H04L 29/12169* (2013.01); *H04L 29/12188* (2013.01); *H04L 29/12433* (2013.01); *H04L 61/1523* (2013.01); *H04L 61/1576* (2013.01); *H04L 61/1588* (2013.01); *H04L 61/2539* (2013.01); *H04L 65/1016* (2013.01); *H04L 67/306* (2013.01); *H04L 41/00* (2013.01); *H04L 69/18* (2013.01); *H04W 8/04* (2013.01); *H04W 8/06* (2013.01); *H04W 8/12* (2013.01); *H04W 8/18* (2013.01); *H04W 8/20* (2013.01); *H04W 60/00* (2013.01); *H04W 64/00* (2013.01); *H04W 80/00* (2013.01); *H04W 80/10* (2013.01)

(56) References Cited

U.S. PATENT DOCUMENTS

| | | | |
|---|---|---|---|
| 5,765,172 | A | 6/1998 | Fox |
| 6,298,383 | B1 | 10/2001 | Gutman et al. |
| 6,522,641 | B1 | 2/2003 | Siu et al. |
| 6,785,730 | B1 | 8/2004 | Taylor |
| 6,816,469 | B1 | 11/2004 | Kung et al. |
| 6,873,849 | B2 | 3/2005 | de la Red et al. |
| 7,027,582 | B2 | 4/2006 | Khello et al. |
| 7,171,460 | B2 | 1/2007 | Kalavade et al. |
| 7,254,603 | B2 | 8/2007 | Weber et al. |
| 7,292,592 | B2 | 11/2007 | Rune |
| 7,304,986 | B2 | 12/2007 | Allen et al. |
| 7,319,857 | B2 | 1/2008 | Baldwin et al. |
| 7,380,022 | B2 | 5/2008 | Tell et al. |
| 7,551,926 | B2 | 6/2009 | Rune |
| 7,844,745 | B1 | 11/2010 | Darbyshire et al. |
| 7,916,685 | B2 * | 3/2011 | Schaedler et al. ............ 370/328 |
| 8,015,293 | B2 | 9/2011 | Schaedler et al. |
| 8,149,725 | B2 | 4/2012 | Lipps et al. |
| 8,547,908 | B2 | 10/2013 | Marsico |
| 8,615,237 | B2 | 12/2013 | Baniel et al. |
| 8,737,304 | B2 | 5/2014 | Karuturi et al. |
| 8,825,060 | B2 | 9/2014 | McCann et al. |
| 8,918,469 | B2 | 12/2014 | Sprague et al. |
| 8,942,747 | B2 | 1/2015 | Marsico |
| 9,059,948 | B2 * | 6/2015 | Schaedler et al. |
| 2001/0028636 | A1 | 10/2001 | Skog et al. |
| 2002/0131395 | A1 | 9/2002 | Wang |
| 2002/0147845 | A1 | 10/2002 | Sanchez-Herrero et al. |
| 2002/0194378 | A1 | 12/2002 | Foti |
| 2002/0196775 | A1 | 12/2002 | Tuohino et al. |
| 2003/0005350 | A1 | 1/2003 | Koning et al. |
| 2003/0040280 | A1 | 2/2003 | Koskelainen |
| 2003/0131151 | A1 | 7/2003 | Roach et al. |
| 2003/0133558 | A1 | 7/2003 | Kung et al. |
| 2003/0149774 | A1 | 8/2003 | McConnell et al. |
| 2003/0233461 | A1 | 12/2003 | Mariblanca-Nieves et al. |
| 2004/0098612 | A1 | 5/2004 | Lee et al. |
| 2004/0103157 | A1 | 5/2004 | Requena et al. |
| 2004/0152469 | A1 | 8/2004 | Yla-Outinen et al. |
| 2004/0203763 | A1 | 10/2004 | Tammi |
| 2004/0205212 | A1 | 10/2004 | Huotari et al. |
| 2004/0223489 | A1 | 11/2004 | Rotsten et al. |
| 2004/0225878 | A1 | 11/2004 | Costa-Requena et al. |
| 2004/0234060 | A1 | 11/2004 | Tammi et al. |
| 2004/0246965 | A1 | 12/2004 | Westman et al. |
| 2004/0260816 | A1 | 12/2004 | Skog et al. |
| 2005/0007984 | A1 | 1/2005 | Shaheen et al. |
| 2005/0009520 | A1 | 1/2005 | Herrero et al. |
| 2005/0058125 | A1 | 3/2005 | Mutikainen et al. |
| 2005/0078642 | A1 * | 4/2005 | Mayer et al. ............ 370/338 |
| 2005/0083904 | A1 | 4/2005 | Khartabil et al. |
| 2005/0094594 | A1 | 5/2005 | Roh |
| 2005/0120198 | A1 | 6/2005 | Bajko et al. |
| 2005/0124341 | A1 | 6/2005 | Myllymaki et al. |
| 2005/0136926 | A1 * | 6/2005 | Tammi et al. ............ 455/435.1 |
| 2005/0141511 | A1 | 6/2005 | Gopal |
| 2005/0155036 | A1 | 7/2005 | Tiainen et al. |
| 2005/0159156 | A1 | 7/2005 | Bajko et al. |
| 2005/0227675 | A1 * | 10/2005 | Lim et al. ............ 455/414.1 |
| 2005/0249196 | A1 | 11/2005 | Ansari et al. |
| 2005/0271055 | A1 | 12/2005 | Stupka |
| 2006/0002308 | A1 * | 1/2006 | Na et al. ............ 370/252 |
| 2006/0030320 | A1 | 2/2006 | Tammi et al. |
| 2006/0030321 | A1 | 2/2006 | Choi |
| 2006/0045249 | A1 | 3/2006 | Li et al. |
| 2006/0068816 | A1 | 3/2006 | Pelaez et al. |
| 2006/0077926 | A1 | 4/2006 | Rune |
| 2006/0078119 | A1 | 4/2006 | Jee et al. |
| 2006/0090001 | A1 | 4/2006 | Collins |
| 2006/0121913 | A1 | 6/2006 | Lin et al. |
| 2006/0136557 | A1 | 6/2006 | Schaedler et al. |
| 2006/0172730 | A1 | 8/2006 | Matsuda |
| 2006/0211423 | A1 | 9/2006 | Ejzak et al. |
| 2006/0221972 | A1 | 10/2006 | Bhargava et al. |
| 2006/0230263 | A1 | 10/2006 | Bhogal et al. |
| 2006/0274744 | A1 | 12/2006 | Nagai et al. |
| 2007/0032194 | A1 | 2/2007 | Griffin |
| 2007/0036312 | A1 | 2/2007 | Cai et al. |
| 2007/0100981 | A1 | 5/2007 | Adamczyk et al. |
| 2007/0121596 | A1 | 5/2007 | Kurapati et al. |
| 2007/0153771 | A1 | 7/2007 | Doradla et al. |
| 2007/0174400 | A1 | 7/2007 | Cai et al. |
| 2007/0189215 | A1 * | 8/2007 | Wu et al. ............ 370/331 |
| 2007/0242637 | A1 | 10/2007 | Dynarski et al. |
| 2007/0297419 | A1 | 12/2007 | Asherup et al. |
| 2008/0005300 | A1 | 1/2008 | Grayson et al. |
| 2008/0014961 | A1 | 1/2008 | Lipps et al. |
| 2008/0025221 | A1 | 1/2008 | Lipps et al. |
| 2008/0039104 | A1 | 2/2008 | Gu et al. |
| 2008/0256251 | A1 | 10/2008 | Huotari et al. |
| 2009/0089435 | A1 * | 4/2009 | Terrill et al. ............ 709/227 |
| 2009/0129271 | A1 | 5/2009 | Ramankutty et al. |
| 2009/0177796 | A1 | 7/2009 | Falk et al. |
| 2009/0196231 | A1 | 8/2009 | Giaretta et al. |
| 2009/0196290 | A1 | 8/2009 | Zhao et al. |
| 2009/0221310 | A1 | 9/2009 | Chen et al. |
| 2009/0232011 | A1 | 9/2009 | Li et al. |
| 2009/0264097 | A1 | 10/2009 | Cai et al. |
| 2009/0265467 | A1 | 10/2009 | Peles |
| 2009/0305684 | A1 | 12/2009 | Jones et al. |
| 2010/0070581 | A1 | 3/2010 | Hewes et al. |
| 2010/0268802 | A1 | 10/2010 | Lipps et al. |
| 2010/0268814 | A1 | 10/2010 | Cross et al. |
| 2010/0290392 | A1 | 11/2010 | Rasanen et al. |
| 2010/0291923 | A1 | 11/2010 | Zhou et al. |
| 2010/0299451 | A1 | 11/2010 | Yigang et al. |
| 2010/0311392 | A1 | 12/2010 | Stenfelt et al. |
| 2010/0331023 | A1 | 12/2010 | Cai et al. |
| 2011/0040845 | A1 | 2/2011 | Cai et al. |
| 2011/0116378 | A1 | 5/2011 | Ramankutty et al. |
| 2011/0116382 | A1 | 5/2011 | McCann et al. |
| 2011/0158090 | A1 | 6/2011 | Riley et al. |
| 2011/0165901 | A1 | 7/2011 | Baniel et al. |
| 2011/0199906 | A1 | 8/2011 | Kanode et al. |
| 2011/0200053 | A1 | 8/2011 | Kanode et al. |
| 2011/0202612 | A1 | 8/2011 | Craig et al. |
| 2011/0202614 | A1 | 8/2011 | Craig et al. |
| 2011/0202676 | A1 | 8/2011 | Craig et al. |
| 2011/0225113 | A1 | 9/2011 | Mann |
| 2011/0225280 | A1 | 9/2011 | Delsesto et al. |
| 2011/0225306 | A1 | 9/2011 | Delsesto et al. |

(56) References Cited

U.S. PATENT DOCUMENTS

| | | |
|---|---|---|
| 2011/0282904 A1 | 11/2011 | Schaedler et al. |
| 2011/0302244 A1 | 12/2011 | McCann et al. |
| 2011/0314178 A1 | 12/2011 | Kanode et al. |
| 2012/0089993 A1 | 4/2012 | Alonso Alarcon et al. |
| 2012/0096177 A1 | 4/2012 | Rasanen |
| 2012/0124220 A1 | 5/2012 | Zhou et al. |
| 2012/0155389 A1 | 6/2012 | McNamee et al. |
| 2012/0155470 A1 | 6/2012 | McNamee et al. |
| 2012/0201203 A1 | 8/2012 | Miyagawa et al. |
| 2012/0202550 A1 | 8/2012 | Marsico |
| 2012/0224524 A1 | 9/2012 | Marsico |
| 2012/0224531 A1 | 9/2012 | Karuturi et al. |
| 2012/0225679 A1 | 9/2012 | McCann et al. |
| 2012/0226758 A1 | 9/2012 | Sprague et al. |
| 2012/0226814 A1 | 9/2012 | Stucker |
| 2012/0236871 A1 | 9/2012 | Wallace et al. |
| 2012/0239771 A1 | 9/2012 | Rasanen |
| 2012/0311064 A1 | 12/2012 | Deo |
| 2013/0304843 A1 | 11/2013 | Chow et al. |
| 2014/0207941 A1 | 7/2014 | McCann |

FOREIGN PATENT DOCUMENTS

| | | |
|---|---|---|
| EP | 1 357 720 A1 | 10/2003 |
| EP | 1 630 999 A1 | 3/2006 |
| EP | 2 107 725 A1 | 10/2009 |
| EP | 2 242 205 A1 | 10/2010 |
| EP | 2 220 841 B1 | 9/2011 |
| EP | 1 847 076 B1 | 2/2012 |
| EP | 1 846 832 B1 | 4/2012 |
| EP | 2 466 828 A1 | 6/2012 |
| JP | H11-224219 A | 8/1999 |
| JP | 4041038 B2 | 1/2008 |
| JP | 2010-0278884 A | 12/2010 |
| JP | 2013-527999 T | 7/2013 |
| WO | WO 2004/064442 A1 | 7/2004 |
| WO | WO 2006/066145 A2 | 6/2006 |
| WO | WO 2006/066149 A2 | 6/2006 |
| WO | WO 2008/008226 A2 | 1/2008 |
| WO | WO 2008/016607 A2 | 2/2008 |
| WO | WO 2009/070179 A1 | 6/2009 |
| WO | WO 2010/139360 A1 | 12/2010 |
| WO | WO 2011/082090 A2 | 7/2011 |
| WO | WO 2011/156274 A2 | 12/2011 |
| WO | WO 2012/106710 A1 | 8/2012 |
| WO | WO 2012/118959 A1 | 9/2012 |
| WO | WO 2012/118963 A1 | 9/2012 |
| WO | WO 2012/118967 A1 | 9/2012 |
| WO | WO 2012/119147 A1 | 9/2012 |
| WO | WO 2012/154674 A2 | 11/2012 |
| WO | WO 2014/116464 A1 | 7/2014 |

OTHER PUBLICATIONS

Second Office Action for Japanese Patent Application No. 2013-556857 (Apr. 14, 2015).
Letter Regarding Notice of Grant for Japanese Patent Application No. 2013-556675 (Mar. 31, 2015).
Non-Final Office Action for U.S. Appl. No. 13/192,410 (Feb. 20, 2014).
Applicant-Initiated Interview Summary for U.S. Appl. No. 13/192,410 (Oct. 18, 2013).
Non-Final Office Action for U.S. Appl. No. 13/192,410 (Dec. 20, 2012).
Non-Final Official Action for U.S. Appl. No. 12/827,746 (May 10, 2012).
Decision to grant a European patent pursuant to Article 97(1) EPC for European Application No. 05854512.0 (Mar. 15, 2012).
Decision to grant a European patent pursuant to Article 97(i) EPC for European Application No. 05854503.9 (Jan. 19, 2012).
Notice of Allowance and Fee(s) Due for U.S. Appl. No. 11/605,947 (Dec. 13, 2011).
Notice of Panel Decision from Pre-Appeal Brief Review for U.S. Appl. No. 11/605,947 (Dec. 9, 2011).
Communication under Rule 71(3) EPC for European application No. 05854512.0 (Nov. 11, 2011).
Communication under Rule 71(3) EPC for European application No. 05854503.9 (Jul. 18, 2011).
Final Official Action for U.S. Appl. No. 11/605,947 (Jun. 28, 2011).
Notice of Allowance and Fee(s) Due for U.S. Appl. No. 11/303,757 (May 11, 2011).
Notice of Abandonment for U.S. Appl. No. 11/584,247 (May 4, 2011).
Interview Summary for U.S. Appl. No. 11/605,947 (Apr. 12, 2011).
Official Action for U.S. Appl. No. 11/605,947 (Jan. 5, 2011).
Supplemental Notice of Allowability for U.S. Appl. No. 11/305,851 (Jan. 3, 2011).
Official Action for U.S. Appl. No. 11/303,757 (Dec. 22, 2010).
Notice of Allowance and Fee(s) Due for U.S. Appl. No. 11/305,851 (Nov. 18, 2010).
Chinese Official Action for Chinese Patent Application No. 200780036126.2 (Oct. 25, 2010).
Official Action for U.S. Appl. No. 11/584,247 (Oct. 19, 2010).
Communication pursuant to Article 94(3) EPC for European Application No. 05 854 503.9 (Oct. 13, 2010).
Communication pursuant to Article 94(3) EPC for European Application No. 05 854 512.0 (Oct. 12, 2010).
Interview Summary for U.S. Appl. No. 11/605,947 (Sep. 17, 2010).
Final Official Action for U.S. Appl. No. 11/305,851 (Aug. 12, 2010).
Official Action for Chinese Patent Application No. 200780033839.3 (Jul. 15, 2010).
Final Official Action for U.S. Appl. No. 11/605,947 (Jul. 8, 2010).
Final Official Action for U.S. Appl. No. 11/584,247 (Apr. 14, 2010).
Interview Summary for U.S. Appl. No. 11/605,947 (Mar. 23, 2010).
Communication pursuant to Article 94(3) EPC for European Application No. 05854512.0 (Feb. 8, 2010).
Communication pursuant to Article 94(3) EPC for European Application No. 05854503.9 (Feb. 8, 2010).
Final Official Action for U.S. Appl. No. 11/305,851 (Jan. 27, 2010).
Final Official Action for U.S. Appl. No. 11/303,757 (Dec. 9, 2009).
Supplementary European Search Report for European Application No. 05854503.9 (Nov. 17, 2009).
Supplementary European Search Report for European Application No. 05854512.0 (Nov. 17, 2009).
Official Action for U.S. Appl. No. 11/605,947 (Oct. 16, 2009).
Interview Summary for U.S. Appl. No. 11/584,247 (Sep. 25, 2009).
Official Action for U.S. Appl. No. 11/584,247 (Sep. 11, 2009).
Official Action for U.S. Appl. No. 11/305,851 (Aug. 14, 2009).
Interview Summary for U.S. Appl. No. 11/584,247 (Jun. 25, 2009).
Restriction Requirement for U.S. Appl. No. 11/605,947 (Jun. 1, 2009).
Official Action for U.S. Appl. No. 11/303,757 (May 28, 2009).
Official Action for U.S. Appl. No. 11/584,247 (Mar. 13, 2009).
Final Official Action for U.S. Appl. No. 11/303,757 (Oct. 6, 2008).
Official Action for U.S. Appl. No. 11/303,757 (May 7, 2008).
Notification of Transmittal of the International Search Report and the Written Opinion corresponding to International Application No. PCT/US05/45813 (Mar. 24, 2008).
Official Action for U.S. Appl. No. 11/303,757 (Feb. 21, 2008).
Notification of Transmittal of the International Search Report and Written Opinion of the International Searching Authority, or the Declaration corresponding to International Patent Application No. PCT/US07/17116 (Feb. 15, 2008).
Notification of Transmittal of the International Search Report and Written Opinion of the International Searching Authority, or the Declaration corresponding to International Application No. PCT/US07/15290 (Feb. 15, 2008).
Restriction Requirment for U.S. Appl. No. 11/303,757 (Oct. 4, 2007).
Notification of Transmittal of the International Search Report and the Written Opinion of the International Searching Authority, or the Declaration for International Application No. PCT/US05/45802 (Sep. 15, 2006).
Linux-HA Architecture (Release 2), BasicArchitecture: Linux HA, http://www.linux-ha.org/BasicArchitecture, pp. 1-7 (Jun. 8, 2006).
"Tekelec Announces TekCore IMS Core Platform," (Jun. 5, 2006).

(56) References Cited

OTHER PUBLICATIONS

"IP Multimedia Subsystem," Wikipedia, http://en.wikipedia.org/wiki/IP_Multimedia_Subystem (Downloaded from the Internet on May 22, 2006).
"Operator Guidebook to IMS and New Generation Networks and Services," www.morianagroup.com, Second Edition (Feb. 2006).
"Operator Guidebook to IMS and New Generation Networks and Services," www.morianagroup.com, First Edition (Aug. 2005).
Gonzalo et al., "The 3G IP Multimedia Subsystem," Chapter 3: General Principles of the IMS Architecture (Aug. 20, 2004).
"IP Multimedia Subsystem IMS Over and Applications," 3G Americas, pp. 1-17 (Jul. 2004).
"3rd Generation Partnership Project; technical Specification Group Core Network; IP Multimedia (IM) Session Handling; IM Call Model; Stage 2 (Release 6)," 3GPP TS 23.218, V6.1.0, pp. 1-56 (Mar. 2004).
"All-IP Core Network Multimedia Domain," 3rd Generation Partnerships Project 2 (3GPP2), 3GPP2 X.S0013-000-0, Version 1.0, pp. i-ii and 1-14 (Dec. 2003).
"3rd Generation Partnership Project; Technical Specification Group Core Network; Cx and Dx Interfaces Based on the Diameter Protocol; Protocol Details (Release 5)," 3GPP TS 29.229, V5.6.0, pp. 1-23 (Dec. 2003).
Camarillo, "Compressing the Session Initiation Protocol (SIP)," Network Working Group, RFC 3486 (Feb. 2003).
Garcia-Martin et al., "The Session Initiation Protocol (SIP) and Session Description Protocol (SDP) Static Dictionary for Signaling Compression (SigComp)," Network Working Group, RFC 3485 (Feb. 2003).
Arkko et al., Security Mechanism Agreement for the Session Initiation Protocol (SIP), Network Working Group, RFC 3329 (Jan. 2003).
Price et al., "Signaling Compression (SigComp)," Network Working Group, RFC 3320 (Jan. 2003).
"Digital Cellular Telecommunications System (Phase 2+); Universal Mobile Telecommunications System (UMTS); IP Multimedia Subsystem (IMS); Stage 2 (Release 5)," 3GPP TS 23.228, V5.7.0, pp. 1-130 (Dec. 2002).
Rosenberg et al., "SIP: Session Initiation Protocol," RFC 3261, pp. 1-252 (Jun. 2002).
Howard, "Sipping IETF51 3GPP Security and Authentication," http://www3.ietf.org/proceedings/01aug/slides/sipping-7/index.htm (Dowloaded from Internet on Dec. 16, 2005) (Sep. 13, 2001).
Narten et al., "Privacy Extensions for Stateless Address Autoconfiguration in IPv6," RFC 3041, pp. 1-16 (Jan. 2001).
Faltstrom, "E.164 Number and DNS," RFC 2916, pp. 1-10 (Sep. 2000).
Vaha-Sipila, "URLs for Telephone Calls," RFC 2806, pp. 1-20 (Apr. 2000).
Aboba et al., "The Network Access Identifier," RFC 2486, pp. 1-8 (Jan. 1999).
Calhoun et al., "Diameter Proxy Server Extensions," IETF Working Draft, draft-calhoun-diameter-proxy-01.txt (Aug. 1, 1998).
Berners-Lee et al., "Uniform Resource Identifiers (URI): Generic Syntax," RFC 2396, pp. 1-38 (Aug. 1998).
Tekelec, "Eagle® Feature Guide," P/N 910-1225-01 (Jan. 1998).
Jalava, "Service Routing in 3GPP IP Multimedia Subsystem," Nokia, pp. 1-16 (Publication Date Unknown).
Letter Regarding Office Action for Japanese Patent Application No. 2013-556855 (Feb. 24, 2015).
Notice of Allowance and Fee(s) Due and Examiner-Initiated Interview Summary for U.S. Appl. No. 13/192,410 (Feb. 12, 2015).
Applicant-Initiated Interview Summary for U.S. Appl. No. 13/465,552 (Feb. 9, 2015).
Notice of Panel Decision from Pre-Appeal Brief Review for U.S. Appl. No. 13/192,410 (Feb. 4, 2015).
Extended European Search Report for European Patent Application No. 12751986.6 (Jan. 20, 2015).
Non-Final Office Action for U.S. Appl. No. 13/748,547 (Jan. 5, 2015).
Supplemental Notice of Allowability for U.S. Appl. No. 13/366,928 (Dec. 26, 2014).
Non-Final Office Action for U.S. Appl. No. 13/465,552 (Oct. 17, 2014).
Letter Regarding Office Action for Japanese Patent Application No. 2013-556675 (Sep. 30, 2014).
Final Office Action for U.S. Appl. No. 13/192,410 (Sep. 25, 2014).
First Office Action for Japanese Application No. 2013-556857 (Sep. 24, 2014).
Notice of Allowance and Fee(s) Due for U.S. Appl. No. 13/366,928 (Sep. 3, 2014).
Extended European Search Report for European Application No. 12752952.7 (Aug. 27, 2014).
Notification of the First Office Action for Chinese Application No. 201080065174.6 (Aug. 13, 2014).
Extended European Search Report for European Application No. 12751783.7 (Jul. 22, 2014).
Extended European Search Report for European Application No. 12751812.4 (Jul. 16, 2014).
Notice of Allowance and Fee(s) Due for U.S. Appl. No. 13/409,893 (Jul. 10, 2014).
Notification of Transmittal of the International Search Report and the Written Opinion of the International Searching Authority, or the Declaration for International Patent Application No. PCT/US2014/011548 (Mar. 28, 2014).
Communication of European publication number and information on the application of Article 67(3) EPC for European Application No. 12781800.3 (Feb. 12, 2014).
3GPP, "3rd Generation Partnership Project; Technical Specification Group Core Network and Terminals; IP Multimedia (IM) Subsystem Sh interface; Signalling flows and message contents (Release 8)," 3GPP TS 29.328 V8.4.0, pp. 1-42 (Mar. 2009).
Liu et al., "IBM Technical Library, Introduction to Diameter," pp. 1-9, http://www.ibm.com/developerworks/wireless/library/wi-diameter (Jan. 24, 2006).
Camarillo et al., "The 3G IP Multimedia Subsystem (IMS), Merging the Internet and the Cellular Worlds," Second Edition (2006).
Examination Report for Indian Patent Application No. 1094/CHENP/2009 (Feb. 4, 2014).
Examination Report for Indian Patent Application No. 664/CHENP/2009 (Jan. 18, 2014).
Notice of Allowance and Fee(s) Due for U.S. Appl. No. 13/409,914 (Apr. 25, 2014).
Supplemental Notice of Allowability for U.S. Appl. No. 13/409,949 (Apr. 24, 2014).
Non-Final Office Action for U.S. Appl. No. 13/366,928 (Mar. 21, 2014).
Advisory Action Before the Filing of an Appeal Brief for U.S. Appl. No. 13/366,928 (Feb. 10, 2014).
Extended European Search Report for European Application No. 10841605.8 (Feb. 3, 2014).
Notice of Allowance and Fee(s) Due for U.S. Appl. No. 13/409,949 (Jan. 14, 2014).
Final Office Action for U.S. Appl. No. 13/409,914 (Dec. 30, 2013).
Notification of Publication and Entry into Examination Procedure for Chinese Patent Application No. 201280013938.6 (Dec. 18, 2013).
Communication of European publication number and information on the application of Article 67(3) EPC for European Application No. 12751986.6 (Dec. 11, 2013).
Communication of European publication number and information on the application of Article 67(3) EPC for European Application No. 12751783.7 (Dec. 11, 2013).
Communication of European publication number and information on the application of Article 67(3) EPC for European Application No. 12751812.4 (Dec. 11, 2013).
Communication of European publication number and information on the application of Article 67(3) EPC for European Application No. 12741984.4 (Nov. 13, 2013).
Declaration of Mark Kanode for U.S. Appl. No. 13/409,893 (Nov. 1, 2013).
Advisory Action for U.S. Appl. No. 13/192,410 (Oct. 24, 2013).
Final Office Action for U.S. Appl. No. 13/366,928 (Oct. 23, 2013).
Final Office Action for U.S. Appl. No. 13/409,949 (Sep. 19, 2013).

(56) References Cited

OTHER PUBLICATIONS

Advisory Action Before the Filing of an Appeal Brief for U.S. Appl. No. 13/409,893 (Sep. 13, 2013).
Notice of Allowance and Fee(s) Due for U.S. Appl. No. 12/974,869 (Aug. 19, 2013).
Final Office Action for U.S. Appl. No. 13/192,410 (Aug. 5, 2013).
Final Office Action for U.S. Appl. No. 13/409,893 (Jul. 1, 2013).
Non-Final Office Action for U.S. Appl. No. 13/409,914 (Jun. 7, 2013).
Notice of Allowance and Fee(s) Due for U.S. Appl. No. 13/412,352 (May 28, 2013).
Non-Final Office Action for U.S. Appl. No. 13/366,928 (Mar. 26, 2013).
Non-Final Office Action for U.S. Appl. No. 13/409,949 (Feb. 15, 2013).
Notice of Allowance and Fee(s) Due for U.S. Appl. No. 13/366,928 (Jan. 7, 2013).
Non-Final Office Action for U.S. Appl. No. 13/409,893 (Dec. 13, 2012).
Non-Final Official Action for U.S. Appl. No. 12/409,914 (Nov. 6, 2012).
Notification of Transmittal of the International Search Report and the Written Opinion of the International Searching Authority, or the Declaration for International Patent Application No. PCT/US2012/036784 (Nov. 1, 2012).
Non-Final Official Action for U.S. Appl. No. 13/412,352 (Oct. 26, 2012).
Communication of European publication number and information on the application of Article 67(3) EPC for European Patent Application No. 10841605.8 (Oct. 17, 2012).
Notification of Transmital of the International Search Report and the Written Opinion of the International Searching Authority, or the Declaration for International Patent Application No. PCT/US2012/027281 (Jun. 15, 2012).
Notification of Transmittal of the International Search Report and the Written Opinion of the International Searching Authority, or the Declaration for International Application No. PCT/US2012/027263 (Jun. 14, 2012).
Notification of Transmittal of the International Search Report and the Written Opinion of the International Searching Authority, or the Declaration for International Patent Application No. PCT/US2012/027736 (Jun. 12, 2012).
Notification of Transmittal of the International Search Report and the Written Opinion of the International Searching Authority, or the Declaration for International Patent Application No. PCT/US2012/023971 (Jun. 11, 2012.).
Notification of Transmittal of the International Search Report and the Written Opinion of the International Searching Authority, or the Declaration for International Patent Application No. PCT/US2012/027269 (Jun. 11, 2012).
PCT International Patent Application No. PCT/US2012/036784, Titled, "Methods, Systems, and Computer Readable Media for Steering a Subscriber Between Access Networks," (Unpublished, Filed May 7, 2012).
Notification of the Transmittal of the International Search Report and the Written Opinion of the International Searching Authority, or the Declaration for International Application No. PCT/US2010/061934 (Oct. 25, 2011).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 10)," 3GPP TS 29.272, V10.2.0, pp. 1-95 (Mar. 2011).
3GPP, "3rd Generation Partnership Project; Technical Specification Group Services and System Aspects; Policy and Charging Control Architecture (Release 11)," 3GPP TS 23.203 V11.0.1, pp. 1-137 (Jan. 2011).

3GPP, "3rd Generation Partnership Project; Technical Specification Group Core Network and Terminals; Sh Interface based on the Diameter protocol; Protocol details (Release 8)," 3GPP TS 29.329, V8.8.0 (Dec. 2010).
"Digital cellular telecommunications system (Phase 2+); Universal Mobile Telecommunications System (UMTS); LTE; IP Multimedia Subsystem (IMS); Stage 2 (3GPP TS 23.228 version 9.4.0 Release 9)," ETSI TS 123 228, V9.4.0 (Oct. 2010).
"Digital cellular telecommunications system (Phase 2+); Universal Mobile Telecommunications System (UMTS); LTE; End-to-end Quality of Service (QoS) concept and architecture (3GPP TS 23.207 version 9.0.0 Release 9)," ETSI TS 123 207,Y9.0.0 (Oct. 2010).
"3rd Generation Partnership Project; Technical Specification Group Services and System Aspects; Telecommunication management; Charging management; Packet Switched (PS) domain charging (Release 9)," 3GPP TS 32.251, V9.4.0 (Oct. 2010).
"3rd Generation Partnership Project; Technical Specification Group Services and System Aspects; Telecommunication management; Charging management; Diameter charging applications (Release 9)," 3GPP TS 32.299, V9.4.0 (Jun. 2010).
"3rd Generation Partnership Project; Technical Specification Group Services and System Aspects; Telecommunication management; Charging management; Charging architecture and principles (Release 9)," 3GPP TS 32.240, V9.1.0, (Jun. 2010).
Znaty, "Diameter, GPRS, (LTE+ePC=EPS), IMS, PCC and SDM," EFORT, pp. 1-229 (Part 1 of 2) (May 2010).
Znaty, "Diameter, GPRS, (LTE+ePC=EPS), IMS, PCC and SDM," EFORT pp. 230-461 (Part 2 of 2) (May 2010).
3GPP, "3rd Generation Partnership Project; Technical Specification Group Core Network and Terminals; Policy and Charging Control signalling flows and Quality of Service (QoS) parameter mapping (Release 9)," 3rd Generation Partnership Proiect, TS 29.213 V9.2.0, pp. 1-129 (Mar. 2010).
"3rd Generation Partnership Project; Technical Specification Group Core Network and Terminals; Policy and Charging Control over Gx reference point (Release 9)," 3GPP TS 29.212 V9.2.0 (Mar. 2010).
"3rd Generation Partnership Project; Technical Specification Group Services and System Aspects; Policy and charging control architecture (Release 9)," 3GPP TS 23.203, V9.3.0 (Dec. 2009).
"Cisco Content Services Gateway—2nd Generation Release 3.5 Installation and Configuration Guide," Chapter 10: Configuring Gx Support, pp. 10-1-10-10, Chapter 11: Configuring Mobile PCC Support, pp. 11-1-11-8, URL: http://www.cisco.com/en/US/docs/wireless/csq2/3.5/installation/guide/csg3-51.pdf (Jun. 5, 2009).
Rouse, "Platform," http://searchservervirtualization.techtarget.com/definition/platform, pp. 1-2 (2006-2009).
Hakala et al., "Diameter Credit-Control Application," RFC 4006, pp. 1-114 (Aug. 2005).
Calhoun et al., "Diameter Network Access Server Application," RFC 4005, pp. 1-85 (Aug. 2005).
Calhoun et al., "Diameter Mobile IPv4 Application," RFC 4004, pp. 1-53 (Aug. 2005).
"Operator Guidebook to IMS and New Generation Networks and Services," www.morianagroup.com, First Edition, pp. 1-450 (Aug. 2005) (Part 1 of 2).
"Operator Guidebook to IMS and New Generation Networks and Services," www.morianagroup.com, First Edition, pp. 451-934 (Aug. 2005) (Part 2 of 2).
"IMS Security Framework," 3GPP2 S.R0086-0, Version 1.0, pp. 1-39 (Dec. 11, 2003).
"IP Multimedia Subsystem—Accounting Information Flows and Protocol," 3GPP2 X.S0013-008-0, Version 1.0, pp. 1-42 (Dec. 2003).
"IP Multimedia Subsystem—Charging Architecture," 3GPP2 X.S0013-007-0, Version 1.0, pp. 1-16 (Dec. 2003).
Calhoun et al., "Diameter Base Protocol," RFC 3588, pp. 1-147 (Sep. 2003).
Olson et al., "Support for IPv6 in Session Description Protocol (SDP)," RFC 3266, pp. 1-5 (Jun. 2002).
Supplemental Notice of Allowability & Response to Rule 312 Communication for U.S. Appl. No. 13/465,552 (Aug. 27, 2015).
Final Office Action for U.S. Appl. No. 13/748,547 (Aug. 10, 2015).

(56) References Cited

OTHER PUBLICATIONS

Letter Regarding Publication of Patent for Japanese Patent Application No. 2014-509509 (Aug. 5, 2015).
Letter Regarding Publication of Patent for Japanese Patent Application No. 2013-556857 (Aug. 5, 2015).
Letter Regarding Office Action for Japanese Patent Application No. 2013-556860 (Jul. 21, 2015).
Letter Regarding Publication of Patent for Japanese Patent Application No. 2013-556675 (Jun. 10, 2015).
Letter Regarding Notice of Grant for Japanese Patent Application No. 2014-509509 (Jun. 2, 2015).
Letter Regarding Notice of Grant for Japanese Patent Application No. 2013-556857 (May 26, 2015).
Notice of Allowance and Fee(s) Due and Examiner-Initiated Interview Summary for U.S. Appl. No. 13/465,552 (May 20, 2015).

* cited by examiner

METHODS, SYSTEMS, AND COMPUTER PROGRAM PRODUCTS FOR CLUSTERING AND COMMUNICATING BETWEEN INTERNET PROTOCOL MULTIMEDIA SUBSYSTEM (IMS) ENTITIES AND FOR SUPPORTING DATABASE ACCESS IN AN IMS NETWORK ENVIRONMENT

PRIORITY CLAIM

This application is a divisional of U.S. patent application Ser. No. 13/192,410, filed Jul. 27, 2011, which is a continuation of U.S. patent application Ser. No. 11/303,757 (now U.S. Pat. No. 8,015,293), filed Dec. 16, 2005, which claims the benefit of U.S. Provisional Patent Application Ser. No. 60/637,337 and U.S. Provisional Patent Application Ser. No. 60/637,426, both filed Dec. 17, 2004; the disclosures of which are incorporated herein by reference in their entireties.

TECHNICAL FIELD

The subject matter described herein includes methods and systems for implementing and communicating between Internet protocol (IP) multimedia subsystem (IMS) entities. More particularly, the subject matter described herein includes methods, systems, and computer program products for clustering and communicating between IMS entities.

BACKGROUND ART

Internet protocol (IP) multimedia subsystem (IMS) is defined by the Third Generation Partnership Project (3GPP) as a new mobile network infrastructure that enables the convergence of data, speech, and mobile network technology over an IP-based infrastructure. IMS bridges the gap between the existing traditional telecommunications technology and Internet technology, allowing network operators to offer a standardized, reusable platform with new, innovative services by enhancing real time, multimedia mobile services, such as voice services, video telephony, messaging, conferencing, and push services. IMS can be used to provide services for both mobile networks and landline networks at the same time, providing unique mixtures of services with transparency to the end-user.

The main function of IMS is to set up media communication sessions between users and between users and applications. IMS supports the establishment of any type of media session (e.g., voice, video, text, etc.) and provides the service creator the ability to combine services in the same session and dynamically modify sessions "on the fly" (e.g., adding a video component to an existing voice session). As a result, new and innovative user-to-user and multi-user services become available, such as enhanced voice services, video telephony, chat, push-to-talk, and multimedia conferencing, all of which are based on the concept of a multimedia session. The underlying IMS infrastructure enables mobile IP communication services via its ability to find a user in the network and then to establish a session with the user. The key IMS components enabling mobility management are the call session control function (CSCF) and home subscriber server (HSS). The CSCF is essentially a proxy, which aids in the setup and management of sessions and forwards messages between IMS networks. The HSS holds all of the key subscriber information and enables users (or servers) to find and communicate with other end users.

FIG. 1 is a block diagram illustrating a conventional IMS system. In FIG. 1, a visited network 100 includes a proxy CSCF (P-CSCF) 102. The visited network 100 may be part of or in communication with a mobile or fixed network. Accordingly, visited network 100 includes a gateway general packet radio service (GPRS) support node (GGSN) 104, which may in turn communicate with a serving GPRS support node (SGSN) 106 that is in communication with a radio access network (RAN) 108 in which an IMS subscriber is currently located. The subscriber's home network 110 includes an HSS 112 with the subscriber's profile, an interrogating CSCF (I-CSCF) 114, and a serving CSCF (S-CSCF) 116.

IMS uses session initiation protocol (SIP) for multimedia session negotiation and session management. For example, SIP REGISTER and INVITE messages are used for communication between P-CSCF 102, I-CSCF 114, and S-CSCF 116 in FIG. 1. In the example illustrated in FIG. 1, the IMS nodes function collectively as a mobile SIP network, providing routing, network location, and addressing functionalities. The DIAMETER protocol is used between I-CSCF 114 and HSS 112 and between S-CSCF 116 and HSS 112. DIAMETER provides an authentication, authorization and accounting (AAA) framework for applications such as network access or IP mobility in both local and roaming situations.

P-CSCF 102 is the first contact point within the IMS and behaves like a proxy. The P-CSCF 102 forwards a SIP REGISTER request received from the subscriber's user equipment (UE) (not shown) via GGSN 104, SGSN 106, and RAN 108 to I-CSCF 114, whose identity is determined using the home domain name, as provided by the UE. After registration is performed, SIP messages concerning the registered subscriber are forwarded to S-CSCF 116, whose identity P-CSCF 102 received as a result of the registration procedure. P-CSCF 102 also forwards SIP requests or responses to the UE, generates call detail records (CDRs), maintains a security association between itself and each UE, performs SIP message compression and decompression, and authorizes bearer resources and QoS management.

I-CSCF 114 is the contact point within the subscriber's home network 110 for all communication sessions destined for the subscriber or for a roaming subscriber currently located within that network operator's service area. I-CSCF 114 locates and assigns S-CSCF 116 to a user initiating SIP registration, routes a SIP request received from another network to S-CSCF 116, obtains the address of S-CSCF 116 from HSS 112 and forwards the SIP request or response to the S-CSCF 116.

S-CSCF 116 performs the session control services for the UE and maintains session state as needed by the network operator for support of the services. S-CSCF 116 accepts registration requests, obtains IMS subscription information from HSS 112, and provides session control. S-CSCF 116 also acts as a proxy server, i.e., it accepts requests and services them internally or forwards them on, and behaves as a User Agent, i.e., it terminates and independently generates SIP transactions. S-CSCF 116 is responsible for interaction with services platforms for the support of services on behalf of an originating endpoint.

HSS 112 holds the subscriber profile and keeps track of the core network node that is currently holding the subscriber. HSS 112 provides mobility management, call and/or session establishment support, and supports the call and/or session establishment procedures in IMS. HSS 112 supports user security information generation, authentication procedures, user identification handling, access authorization, service authorization support service provisioning support, and provides support for application services. HSS 112 may also communicate with an application server (not shown) to offer value added services. The application server and can reside either in the user's home network or in a third party location and enables different services in the IMS network, such as call-forwarding, call waiting, presence and instant messaging. The application server communicates with the HSS using the DIAMETER protocol.

The P-CSCF, I-CSCF, S-CSCF, and HSS functions are all defined in the 3GPP specifications. However, the 3GPP specifications do not map these components to hardware. Moreover, the 3GPP specifications suggest an implementation, such as that illustrated in FIG. 1, where the components are implemented on separate nodes that communicate with each other over a wide area network. For example, in FIG. 1, the S-CSCF 116 and HSS 112 communicate with each other via the diameter protocol over a wide area network 110.

One problem associated with an implementation, such as that illustrated in FIG. 1 where the IMS functions are implemented on separate nodes that communicate with each other over a wide area network, is that the volume of information exchanged between the functions can place a burden on the communications network and/or increase session setup time. For example, in light of the amount of subscription information that is stored by HSS 112 that must be communicated to S-CSCF 116, the link between S-CSCF 116 and HSS 112 may become a bottleneck. Current 3GPP standards do not address such issues.

Another problem with IMS networks is that IMS network elements, such as CSCFs, may be required to support multiple protocols to communicate with IMS and other network elements.

Accordingly, in light of these difficulties associated with IMS networks, there exists a need for methods, systems, and computer program products for clustering and communicating between IMS entities and for supporting database access in an IMS environment.

SUMMARY

According to one aspect, the subject matter described herein includes a system for clustering and communicating between Internet protocol (IP) multimedia subsystem (IMS) entities. This system includes an interrogating call state control function (I-CSCF) module adapted to receive a communications-session-related message containing a network subscriber identity. The system further includes a serving call state control function (S-CSCF) module adapted to retrieve network subscriber information corresponding to the network subscriber identity and process communication-session-related messages based on the retrieved network subscriber information. A shared local area communications medium interconnects the I-CSCF module and the S-CSCF module and allows the modules to communicate with each other. The communication session related message may be forwarded by the I-CSCF module to the S-CSCF module over the local area communications medium.

According to another aspect, the subject matter described herein includes an Internet protocol (IP) multimedia subsystem (IMS) cluster node. The IMS cluster node includes a serving call state control function (S-CSCF) module for controlling media sessions between IMS users. The cluster node further includes a home subscriber service (HSS) module for storing and providing IMS subscription information to the S-CSCF module. The cluster node further includes a shared memory operatively associated with the S-CSCF module and the HSS module. The S-CSCF module obtains IMS subscription information from the HSS function via the shared memory.

According to yet another aspect, the subject matter described herein includes an Internet protocol (IP) multimedia subsystem (IMS) cluster node. The IMS cluster node includes a first IMS module for implementing at least one aspect of establishing and controlling media sessions between IMS users. The cluster node further includes a second IMS module for implementing another aspect for setting up and controlling media sessions between IMS users. The first and second IMS modules may communicate with each other to establish and control IMS sessions. The first and second IMS modules may be implemented in the same cluster. As used herein, the term "cluster" refers to a grouping of functions where individual functions in the group are connected to each other and communicate via a local area communications medium, such as a bus or a local area network.

The subject matter described herein for implementing and communicating between IMS entities may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer program product comprising computer executable instructions embodied in a computer readable medium. Exemplary computer readable media suitable for implementing the subject matter described herein include disk memory devices, chip memory devices, programmable logic devices, application specific integrated circuits, and downloadable electrical signals. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION OF THE INVENTION

In order to avoid the inefficiencies associated with transmitting messages between IMS entities, such as I-CSCF, a P-CSCF, an S-CSCF, and a HSS, the subject matter described herein includes an IMS cluster node whereby two or more of these IMS functions are implemented on a common platform connected via a shared local area communications medium, such as a bus or local area network (LAN). In one exemplary implementation, two or more of the entities may be implemented on a single card and communicate using shared memory.

Figure 2:
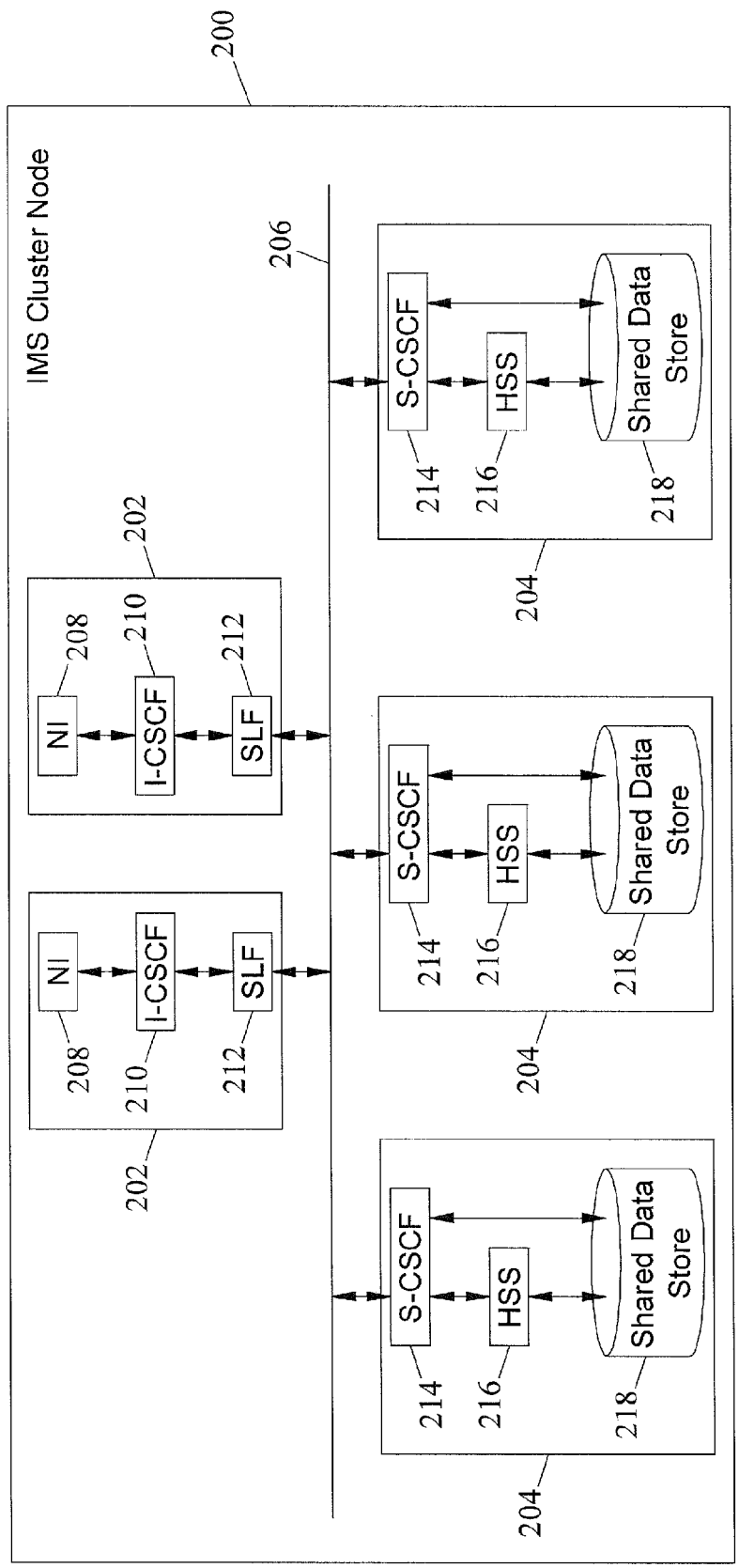
FIG. 2 is a block diagram of an IMS cluster node in accordance with an embodiment of the subject matter described herein.

FIG. 2 is a block diagram of an IMS cluster node 200 in accordance with an embodiment of the subject matter described herein. In FIG. 2, IMS cluster node 200 includes an interrogating call state control function (I-CSCF) module 202, a serving call state control function (S-CSCF) module 204, and a shared local area communications medium 206. Local area communications medium 206 may be any suitable structure that provides a communication path between various printed circuit cards or processor modules in IMS cluster node 200. For example, local area communications medium 206 may be a local area network or a bus. Any module, such as I-CSCF module 202 or S-CSCF module 204, may communicate with other modules in the IMS cluster node 200 via local area communications medium 206.

I-CSCF module 202 may include a network interface (NI) module 208, an I-CSCF processor 210, and a subscription locator function (SLF) module 212. NI module 208 may be adapted to communicate with nodes external to IMS cluster node 200 that are located in circuit switched or packet switched networks. NI module 208 may provide a physical interface to support communication with external networks, message error checking to ensure that received messages are complete, and buffering received messages for processing by I-CSCF processor 210.

I-CSCF processor 210 may be adapted to receive buffered messages and process session initiation protocol (SIP) messages. If the SIP message is a communication-session-related registration message, such as a SIP REGISTER message, I-CSCF processor 210 may forward the message to SLF module 212. SLF module 212 may identify a home subscriber server (HSS) module 216 that contains a subscriber's location and subscription information. Services or information provided by HSS module 216 may include Authentication, Authorization and Accounting (AAA), subscriber IP network mobility management information, subscriber IP network profile information, Equipment Identity Register (EIR) authorization, GSM/IS41 cellular mobility management information, GSM/IS41 subscriber profile information, GSM/IS41 authentication, presence information, etc. SLF module 212 may map an IMS subscriber identification number or ranges of IMS subscriber identification numbers to an IP address associated with an HSS module 216. Non-registration messages may be forwarded by I-CSCF processor 210 to the appropriate S-CSCF module 204 based on mapping information stored by SLF module 212.

S-CSCF module 204 may include a S-CSCF processor 214, HSS entity 216, and a shared data store or memory 218. S-CSCF processor 214 may receive session-related messages from I-CSCF module 210. For example, registration messages may be received by S-CSCF processor 214. S-CSCF processor 214 may query HSS entity 216 to determine connection parameters and/or subscriber options for an end user identified in the registration message. In a conventional network implementation, the connection parameters and subscriber options may include a substantial amount of information. Thus, transferring the information from HSS entity 216 to S-CSCF processor 214 may require substantial network resources, such as bandwidth. In accordance with one embodiment, shared data store or memory 218 containing subscriber information may be associated with HSS entity 216 and may be accessible by S-CSCF processor 214. Thus, in response to a query by S-CSCF processor 214, HSS entity 216 may provide a pointer to a memory location in shared data store 218, thereby permitting subscriber information to be directly accessed by S-CSCF processor 214. By providing S-CSCF processor 214 with direct access to shared data store 218, S-CSCF processor 214 can more efficiently obtain subscriber information without HSS entity 216 becoming a potential communication bottleneck.

Although the example illustrated in FIG. 2 includes an I-CSCF, an S-CSCF, and an HSS module implemented in an IMS cluster node, the subject matter described herein is not limited to implementing these three IMS functions in an IMS cluster node. Implementing any two or more IMS functions or modules in an IMS cluster node is intended to be within the scope of the subject matter described herein. For example, an IMS cluster node may include an S-CSCF and an HSS module that communicate via a shared local area communications medium. In another example, an IMS cluster node may include an I-CSCF and an S-CSCF function or module that communicates a shared communications medium.

Figure 3:
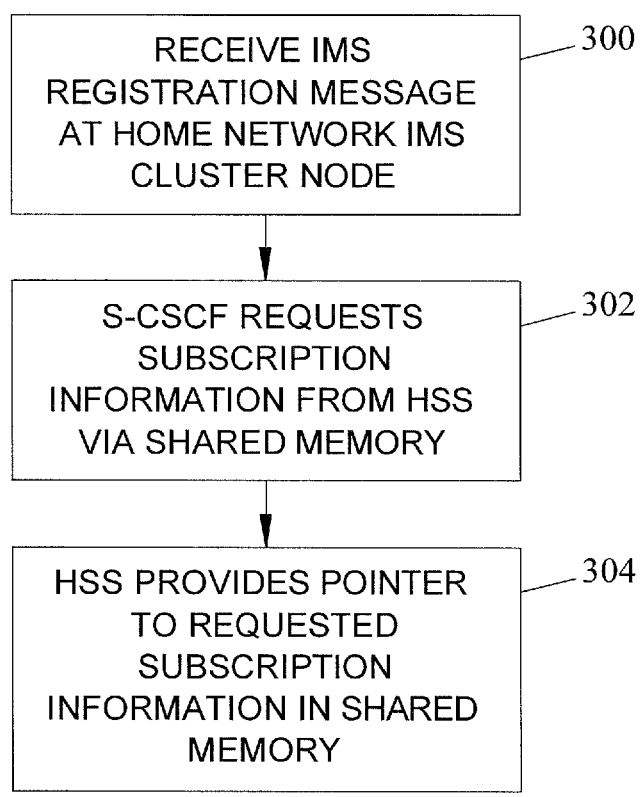
FIG. 3 is a flow chart illustrating exemplary steps for communicating subscription information between an S-CSCF module and HSS module using shared memory according to an embodiment of the subject matter described herein.

FIG. 3 is a flow chart illustrating exemplary steps for communicating between an S-CSCF function and a HSS function using a shared memory or data store according to an embodiment of the subject matter described herein. Referring to FIG. 3, in step 300, an IMS cluster node receives an IMS registration message. The IMS cluster node may be the home IMS cluster node for a subscriber including the HSS and S-CSCF functions for the subscriber. In step 302, the S-CSCF function requests subscription information from the HSS function via shared memory. The request may be sent by writing a message for the HSS function in the shared memory. In step 304, in response to the request, the HSS function provides a pointer to the requested subscription information in the shared memory. Thus, using the steps illustrated in FIG. 3, the efficiency of communicating IMS subscription information between the S-CSCF and HSS function is greatly increased over implementations where these functions are located on separate nodes connected to each other via a wide area network.

In some configurations, subscriber location and subscription information may be stored in an HSS entity that is external to an IMS cluster node. For example, a network operator with an infrastructure including one or more HLRs may wish to upgrade the HLRs to provide HSS functionality, rather than replacing the HLRs with an IMS cluster node that includes HSS functionality. In such an implementation, the IMS cluster node may include the I-CSCF and S-CSCF functions as well as additional functions that communicate with external HSS nodes. In one implementation, the IMS cluster node may include an abstracted profile server (APS) for communicating with external database nodes, such as HLR nodes, and caching IMS subscription information in memory local to the IMS cluster node for subsequent access.

Figure 1:
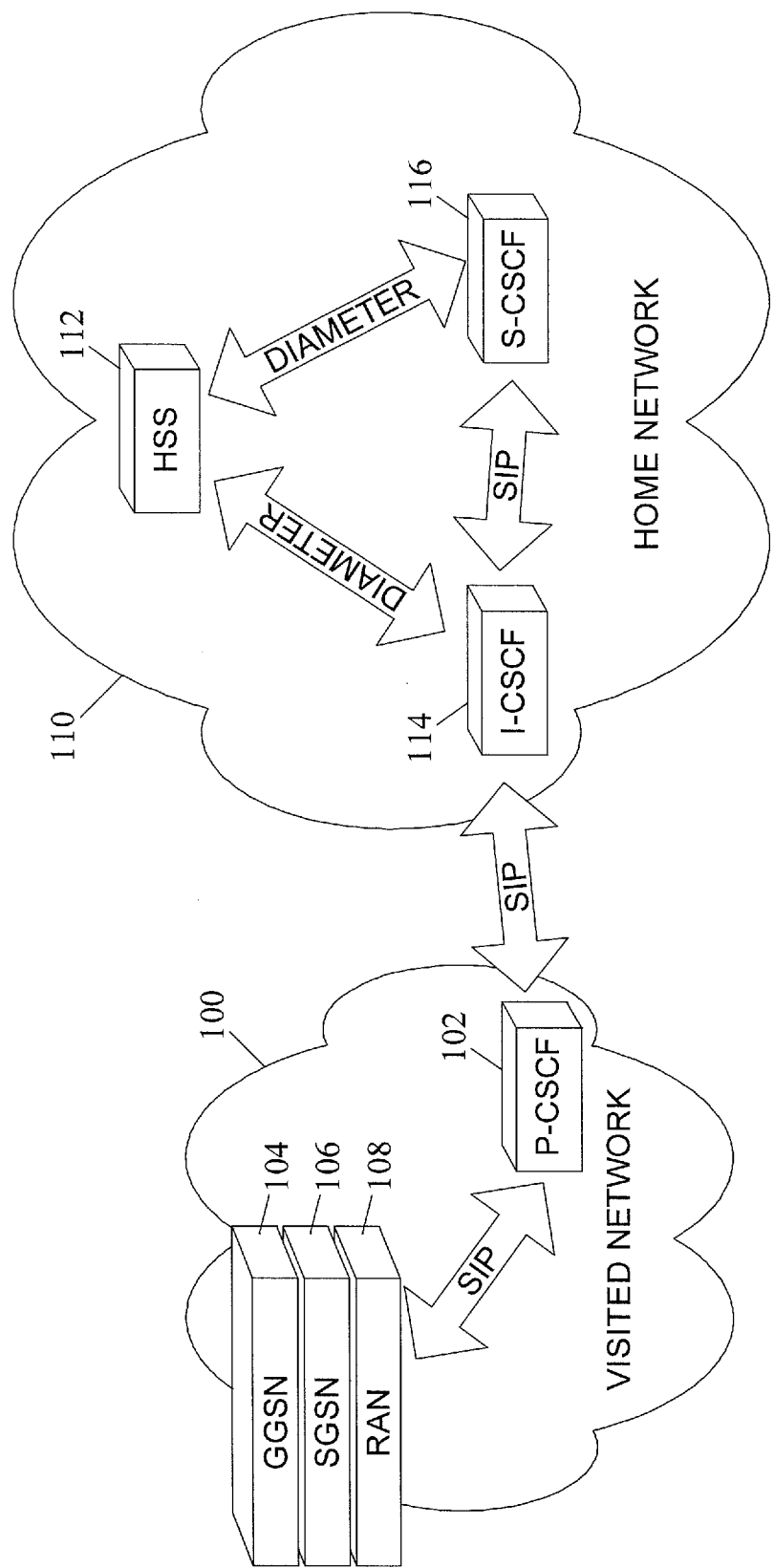
FIG. 1 is a block diagram illustrating a conventional IMS network where IMS entities are implemented on separate platforms.
Figure 4:
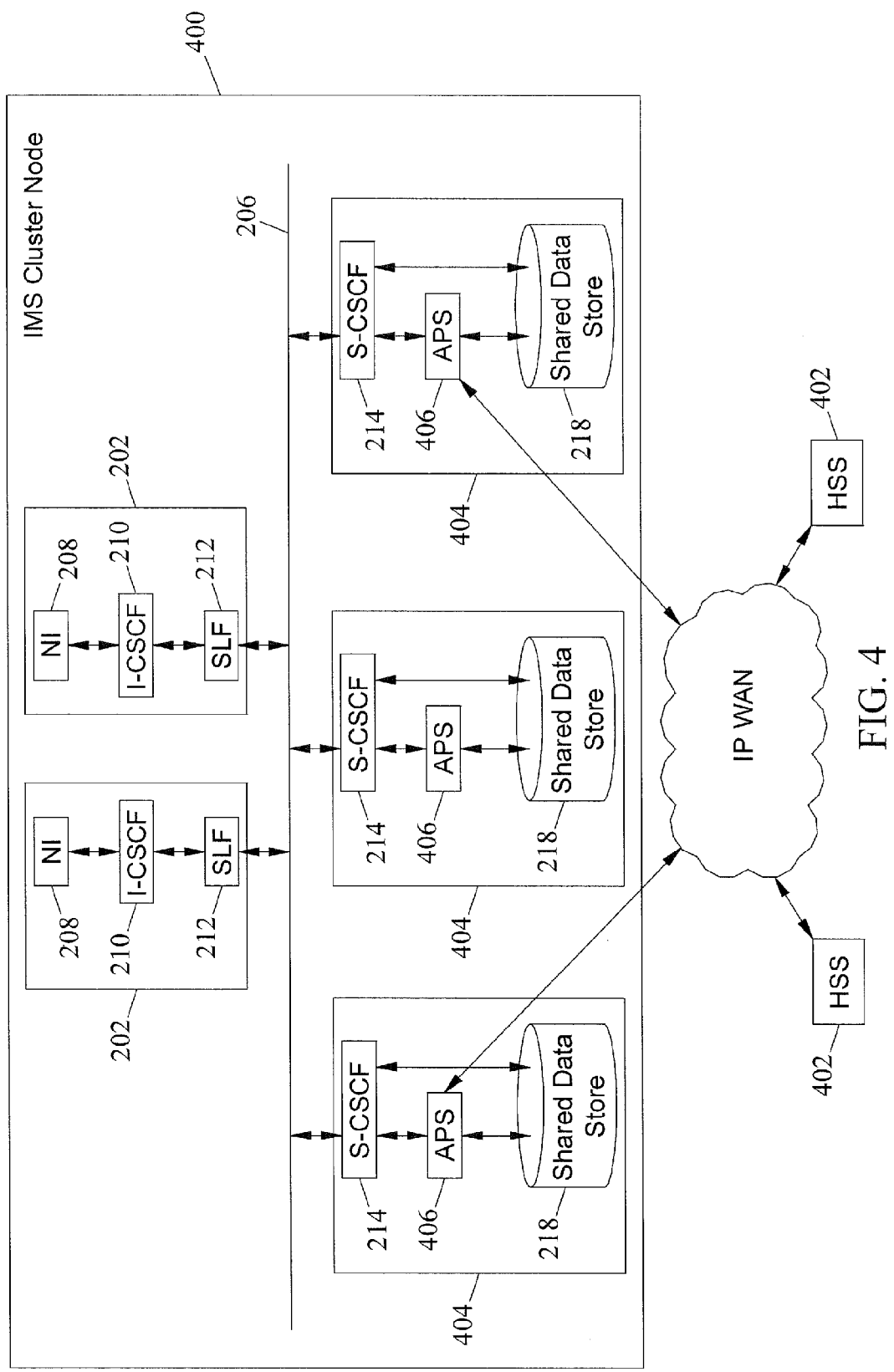
FIG. 4 is a block diagram of an IMS cluster node that may be used to access an external HSS entity according to an embodiment of the subject matter described herein.

FIG. 4 is a block diagram of an IMS cluster node 400 that may be used to access an external HSS entity 402 according to an embodiment of the subject matter described herein. In FIG. 2, IMS cluster node 400 is functionally similar to IMS cluster node 200 described above with respect to FIG. 1. Accordingly, descriptions of various, similarly numbered elements common to both IMS cluster nodes 200 and 400 need not be repeated herein.

As in the previous configuration, SLF module 212 may receive session-related messages, such as a SIP REGISTER message, and identify an external HSS entity 402 that contains a subscriber's location and subscription information. SLF module 212 forwards the message to S-CSCF module 404 that interfaces with HSS entity 402. S-CSCF processor 214 forwards the message to abstracted profile server (APS) module 406. APS module 406 retrieves the subscriber's location and subscription information from external HSS entity 402, and stores the retrieved information in shared data store 218 for later access by S-CSCF processor 214. APS module 406 sends the location of the subscriber's information to S-CSCF processor 214, thereby allowing S-CSCF processor 214 to directly access the stored information.

The APS function is described in detail in U.S. Provisional Patent Application No. 60/637,426 filed Dec. 17, 2004, and in a commonly-assigned, co-pending U.S. Patent Application entitled Methods, Systems, and Computer Program Products for Supporting Database Access in an Internet Protocol Subsystem (IMS) Network Environment (Ser. No. 11/305,851 (now U.S. Pat. No. 7,916,685)), filed on Dec. 16, 2005. In summary, the APS function communicates with external database nodes, such as HSS and HLR nodes to obtain IMS subscription information. The APS function may communicate with the external database nodes using a language or protocol that is native to each of the nodes. The APS function may communicate with internal modules, such as S-CSCF processor 214 using an abstract language. The APS function will be described in further detail below.

As noted above, SLF module 212 may be adapted to identify an IMS cluster node 100 or 200 that contains a subscriber's location and subscription information. Accordingly, SLF module 212 may map an IMS subscriber identifier or range of IMS subscriber identifiers to an IP address associated with an IMS cluster node 200 or 400.

According to another aspect, the subject matter described herein may include a method for providing IMS service using a plurality of IMS cluster nodes. In one implementation, a plurality of IMS cluster nodes may be provided or deployed in the network. Each IMS cluster node may be configured to serve a predetermined set of subscribers. In one implementation, a P-CSCF may forward an IMS related message, such as registration message, to IMS cluster node, and the IMS cluster node may either process the message or forward the message to another IMS cluster node until the correct IMS cluster node is located. In an alternate implementation, a cluster node location function may be provided in the network for locating the correct IMS cluster node among a plurality of IMS cluster nodes.

Figure 5:
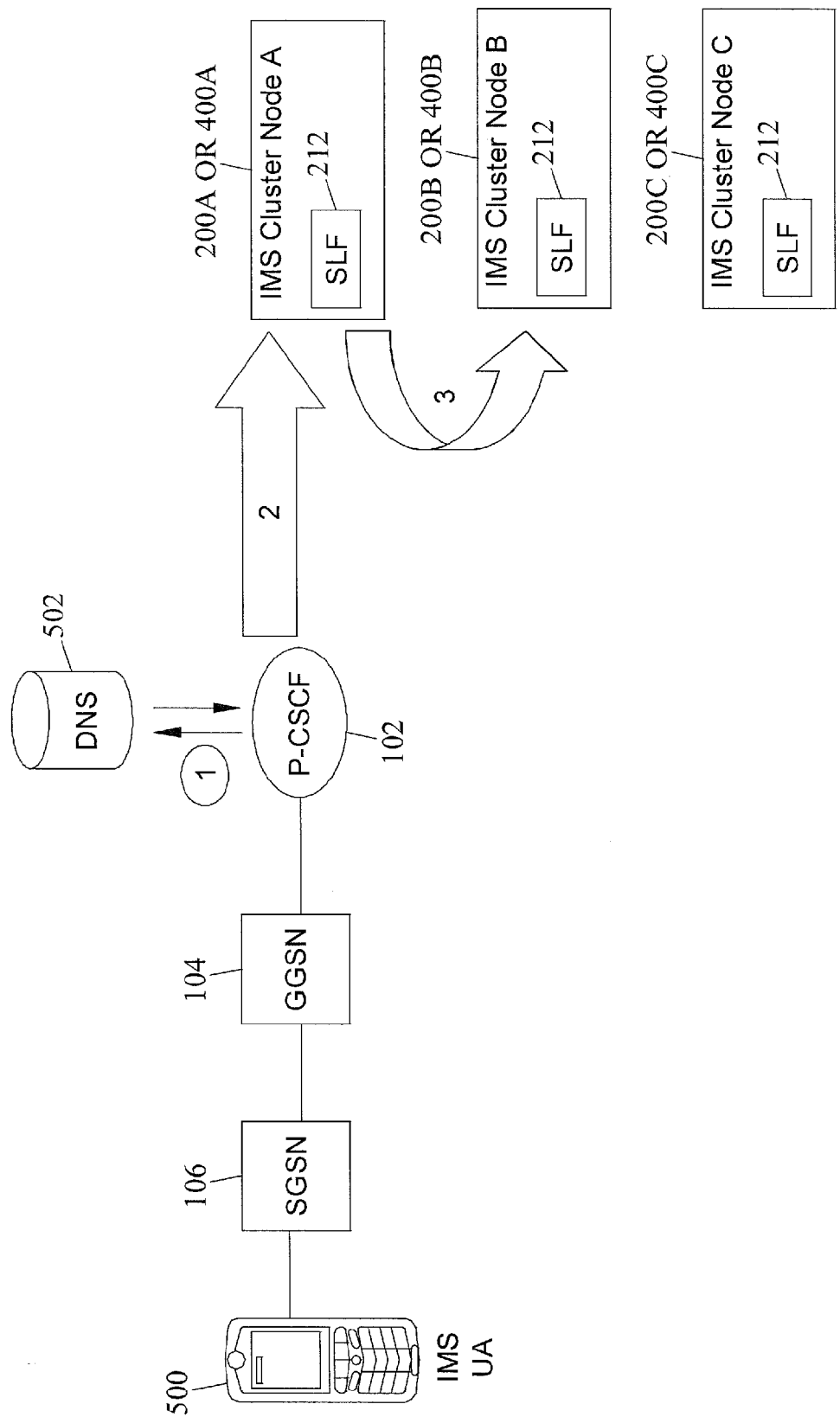
FIG. 5 is a block diagram of an exemplary network configuration including a plurality of IMS cluster nodes according to an embodiment of the subject matter described herein.

FIG. 5 is an example of IMS network architecture where the P-CSCF forwards IMS messages to a first cluster node, and the cluster nodes communicate with each other to locate the correct cluster node to process the message. In FIG. 5, an IMS user agent 500 communicates with a serving GPRS support node (SGSN) 106. SGSN 106 performs mobility management functions, such as detecting new mobile subscribers in a given service area, registration processing of new mobile subscribers, and keeping a record of their location inside a given area. A gateway GPRS support node (GGSN) 104 may serve as an interface between SSGN 106 and GPRS service nodes, including those for network and subscriber screening and address mapping.

Figure 6:
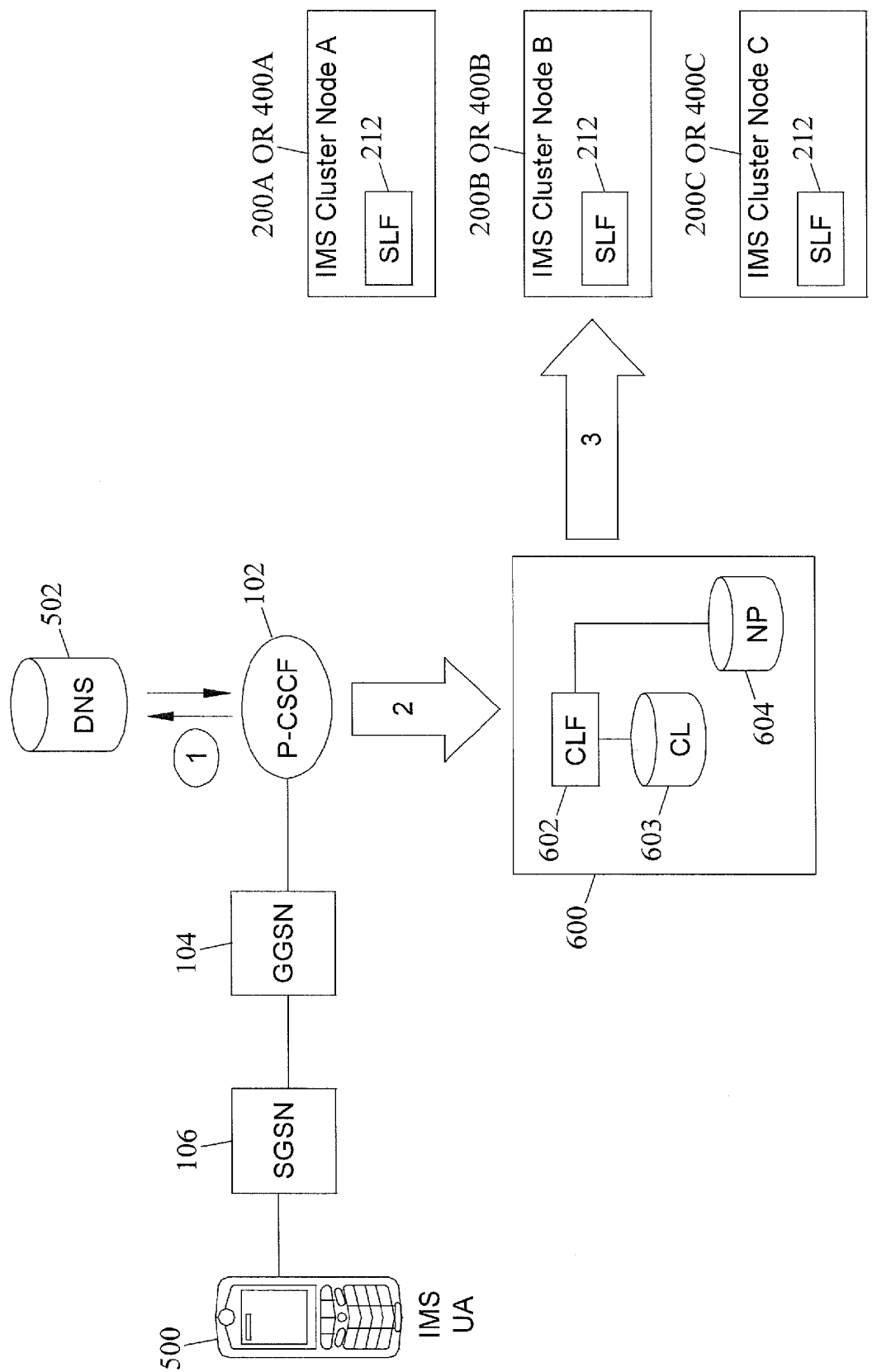
FIG. 6 is a block diagram of an exemplary network configuration utilizing a centrally located IMS cluster access gateway according to an embodiment of the subject matter described herein.
Figure 7:
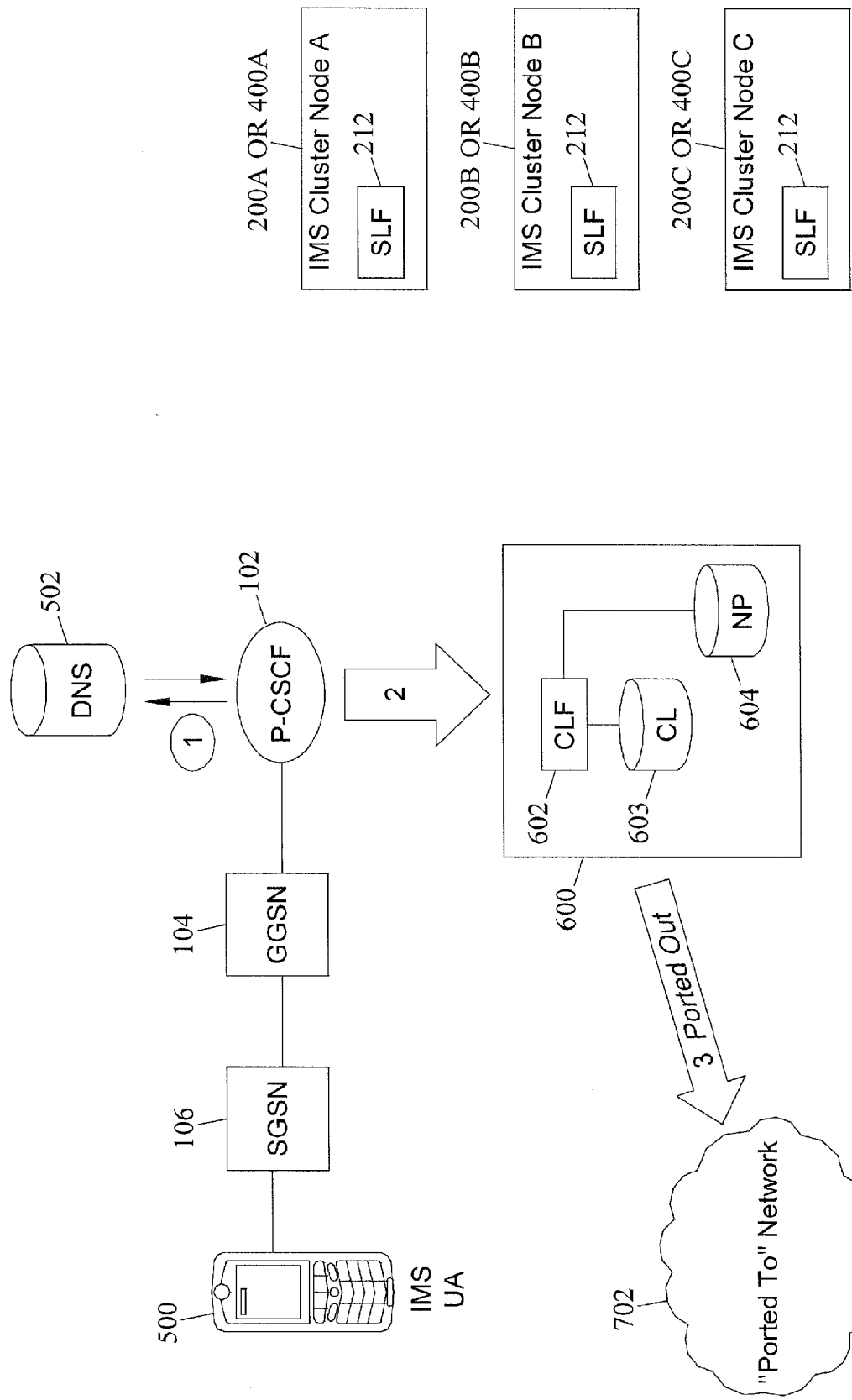
FIG. 7 is a block diagram of an exemplary network configuration utilizing a centrally located IMS cluster access gateway having access to a number portability database according to an embodiment of the subject matter described herein.
Figure 8:
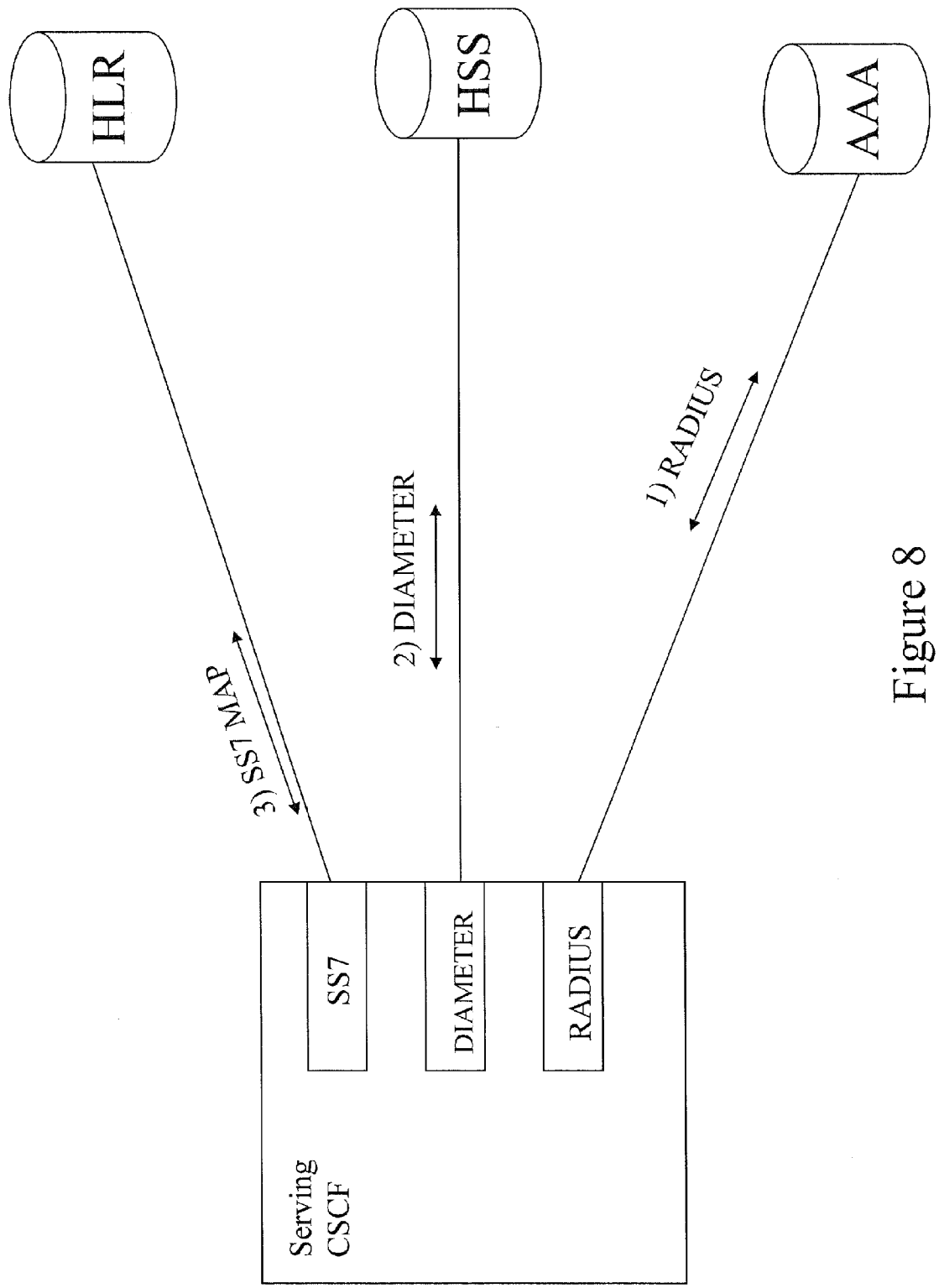
FIGS. 8-14 are network diagrams illustrating abstracted profile server functionality according to an embodiment of the subject matter described herein.

In the message flow illustrated in FIG. 5, a proxy CSCF (P-CSCF) 102 receives an IMS registration message and queries a DNS server 502 to obtain the address of an IMS cluster node (step 1). P-CSCF 308 subsequently forwards the registration message to the IMS cluster node 200A or 400A identified by DNS server 502, as indicated in step 2. In FIGS. 5-7, reference numbers 200A-C or 400A-C are intended to indicate that each IMS cluster node could have a configuration like IMS cluster node 200 illustrated in FIG. 2 or IMS cluster node 400 illustrated in FIG. 4. Using subscriber information contained in the registration message, SLF module 212 in IMS cluster node 200A or 400A determines that the subscriber's information is not contained in IMS cluster node 200A or 400A, but instead is contained in IMS cluster node 200B or 400B. As a result, the message is forwarded or "hopped" from IMS cluster node 200A or 400A to IMS cluster node 200B or 400B (step 3), where processing of the message continues.

In a slight variation to the example illustrated in FIG. 5, the SLF function may be omitted from the IMS cluster nodes, and the IMS cluster nodes may simply perform lookups using their associated HSS functions to determine whether the subscription information is present in each IMS cluster node. If the information is present, the IMS cluster node that receives the registration message may process the message. If the registration information is not present, the IMS cluster node may forward the message to the next IMS cluster node in a group of IMS cluster nodes. The last IMS cluster node in the group may process the messages if it has the appropriate subscription information. If it does not have the appropriate subscription information, an error message may be generated and sent to the P-CSCF 102.

As discussed above, in an alternate implementation, a cluster node location function (CLF) may be provided to locate the appropriate IMS cluster nodes among a plurality of IMS cluster nodes for processing a message. FIG. 6 is a block diagram of an IMS network including a cluster location function according to an embodiment of the subject matter described herein. Referring to FIG. 6, an IMS cluster location node 600 includes a cluster node location function 602, a cluster node location database 603, and a number portability database 604 for locating an appropriate IMS cluster node serving a particular IMS subscriber. Cluster location node 600 may be implemented using any suitable hardware platform that includes a processor and storage capabilities for storing the associated databases. In one exemplary implementation, IMS cluster location node 600 may be implemented using a hardware platform similar to the Eagle® signal transfer point (STP) platform available from Tekelec of Morrisville, N.C. The Eagle® platform includes link interface modules for sending and receiving signaling messages and a database services module for processing database related messages. The cluster location function 602 may perform lookups in cluster location database 603 for the IP or other network address associated with the IMS cluster node. Table 1 shown below illustrates an example of entries that may be present in cluster location database 603.

TABLE 1

Cluster Node Location Data

| IMS Subscriber IDs | Cluster Node IP Address |
|---|---|
| 9194938000-9194938999 | 128.156.0.1 |
| 9194939000-9194939999 | 128.156.0.2 |
| 9194940000-9194949999 | 128.156.0.3 |
| 9194190383 | 128.156.0.1 |

In Table 1, the left hand column includes subscriber identifiers. The right hand column includes corresponding cluster node IP addresses. In the illustrated example, it is assumed that each of the IP addresses corresponds to one of the cluster nodes illustrated in FIG. 6. It should also be noted that in addition to ranges of subscriber identifiers, cluster node location databases may be provisioned with individual subscriber numbers corresponding to subscribers that have been ported into a network, as illustrated by the last entry in Table 1.

In an alternate implementation, cluster location database 603 may be divided into two databases or tables. The first database or table may include entries that are indexed by individual mobile subscriber identifiers. The second database or table may include entries that indexed by ranges of mobile subscriber identifiers. The individual mobile subscriber identifiers in the first database may be inside or outside of the ranges in the second database. In such an implementation, a lookup may first be performed in the portion or database that includes individual mobile subscriber identifiers. If the lookup results in a match, then the registration message may be forwarded to the appropriate IMS cluster node. If the lookup does not result in a match, a lookup may be performed in the range based database or table to locate a matching entry.

As illustrated in FIG. 6, a number portability database 604 may be included in order to determine whether a subscriber has been ported in or out of a network and to provide appropriate LRN information for ported-out subscribers. FIG. 7 illustrates a message routing information for a ported out subscriber. In FIG. 7, P-CSCF 308 queries DNS server 310 to locate CLF location node 600. CLF location node 600 performs a lookup in number portability database 700 and determines that a subscriber has been ported out of the network. In response to determining that the subscriber has been ported out of the network, CLF location node 600 forwards the message to a ported-to network 702.

Enhanced Network Security

According to another aspect of the subject matter described herein, an IMS cluster node is adapted to provide enhanced security for elements of the cluster, such as an HSS element. The advantages of this enhanced IMS cluster security may be easily seen when compared with prior IMS network architectures. For example, in the case of an IMS network that includes a stand-alone HSS element, the HSS element must advertise it's IP network address and port information to other elements in the network (e.g., IP routers, etc.), so that other nodes in the network (e.g., I-CSCF, S-CSCF, application servers, etc.) will know how to reach the HSS. By advertising its reachability information to other nodes in the network, the HSS becomes more vulnerable to malicious attacks, such as denial of service attacks and hacking attacks.

The IMS cluster architecture described above affords significant additional protection to those IMS elements/functions that are incorporated within the node. For example, an HSS element that is incorporated within an IMS cluster may be effectively "hidden" from other nodes in the IMS network. As such, the HSS element is not required to advertise its IP network address and port information to other elements in the network. Instead, reachability information associated with the IMS cluster HSS element need only be known or communicated to "trusted" I-CSCF or S-CSCF elements that are associated with the IMS cluster. As such, the IMS cluster HSS element is significantly less vulnerable to malicious attacks, including denial of service and hacking type attacks.

In one embodiment, an I-CSCF element associated with an IMS cluster node may implement a network address translation (NAT) function on behalf of other elements in the IMS cluster, such as an HSS element. For example, using an NAT may be provided in front of HSS cluster node 200 or 400 or any other of the IMS cluster node examples described herein so that the addresses of internal cluster node elements are hidden from external elements, while still allowing the external elements to communicate with the internal cluster node elements. In such an architecture, the NAT may advertise a translated IP address for each internal IMS cluster node element to external nodes desiring to communicate with an internal cluster node element. When the NAT receives a packet for the internal cluster node element, the NAT may translate the destination IP address in the packet from the advertised address to the hidden internal address for the internal cluster node element.

Abstracted Profile Server (APS) Functionality

FIGS. 8-14 illustrated abstracted profile server (APS) functionality according to an embodiment of the subject matter described herein. FIGS. 8-14 correspond to FIGS. 1-7 in the above-incorporated provisional patent application Ser. No. 60/637,426. The description below corresponds to the description of FIGS. 1-7 in the above-incorporated provisional patent application Ser. No. 60/637,426 with figure numbers updated.

To facilitate an understanding of exemplary embodiments, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

Moreover, the sequences of actions can be embodied in any computer-readable medium for use by or in connection with an instruction execution system, apparatus, or device, such as a computer-based system, processor containing system, or other system that can fetch the instructions from a computer-readable medium and execute the instructions.

As used herein, a "computer-readable medium" can be any means that can contain or store the program for use by or in connection with the instruction execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium can include the following: a portable computer diskette, a random access memory (RAM), a read-only memory (ROM), an erasable programmable read-only memory (EPROM or Flash memory), and a portable compact disc read-only memory (CDROM).

Thus, the subject matter described herein can be embodied in many different forms, and all such forms are contemplated to be within the scope of what is claimed. Any such form of embodiment can be referred to herein as "logic configured to" perform a described action, or alternatively as "logic that" performs a described action.

One aspect of the present invention relates to a novel implementation of IMS functions in a network. More particularly, the use of an abstracted profile server (APS) is disclosed.

In previously contemplated IMS core network architecture models a serving CSCF (S-CSCF) entity is adapted to communicate with an HSS entity using a protocol such as DIAMETER to obtain subscriber profile and IM mobility management information associated with an IMS subscriber. The S-CSCF entity may also be required to communicate with an Authentication, Authorization and Accounting (AAA) server using a protocol such as RADIUS, or with an ENUM database server using DNS protocol. In order to provide support for legacy networks, the S-CSCF entity may also need to access/communicate with other mobile subscriber databases, such as a GSM or IS-41 home location register (HLR), an Equipment Identity Register (EIR), or an Authentication Center (AuC) using protocols including, but not limited to, Signaling System 7 (SS7) Signaling Connection Control Part (SCCP), SCCP User Part Adaptation Layer (SUA), Transaction Capabilities Application Part (TCAP), Lightweight Directory Access Protocol (LDAP) and Mobile Application Part (MAP). See FIG. 8.

The simultaneous support of such numerous native Cx interface protocols by a CSCF entity is not practical from a network operation standpoint due to the complex (and potentially dynamic) nature of the associated multi-protocol control logic. With regard to the dynamic nature of the control logic, it will be appreciated that it in certain signaling scenarios it may be necessary to query several network entities (e.g., HSS, HLR, AAA, EIR, AuC, Presence Server, etc.) in a particular sequence, where the sequence is based, at least in part, on the responses obtained from the various network entities. For example, for a single communication transaction, an AAA server may be queried using RADIUS protocol and based on the response returned by the AAA server, it may be determined that an HSS entity should be queried using DIAMETER protocol. Based on the response provided by the HSS, it may then be determined that a GSM HLR should be queried using MAP protocol.

Figure 9:
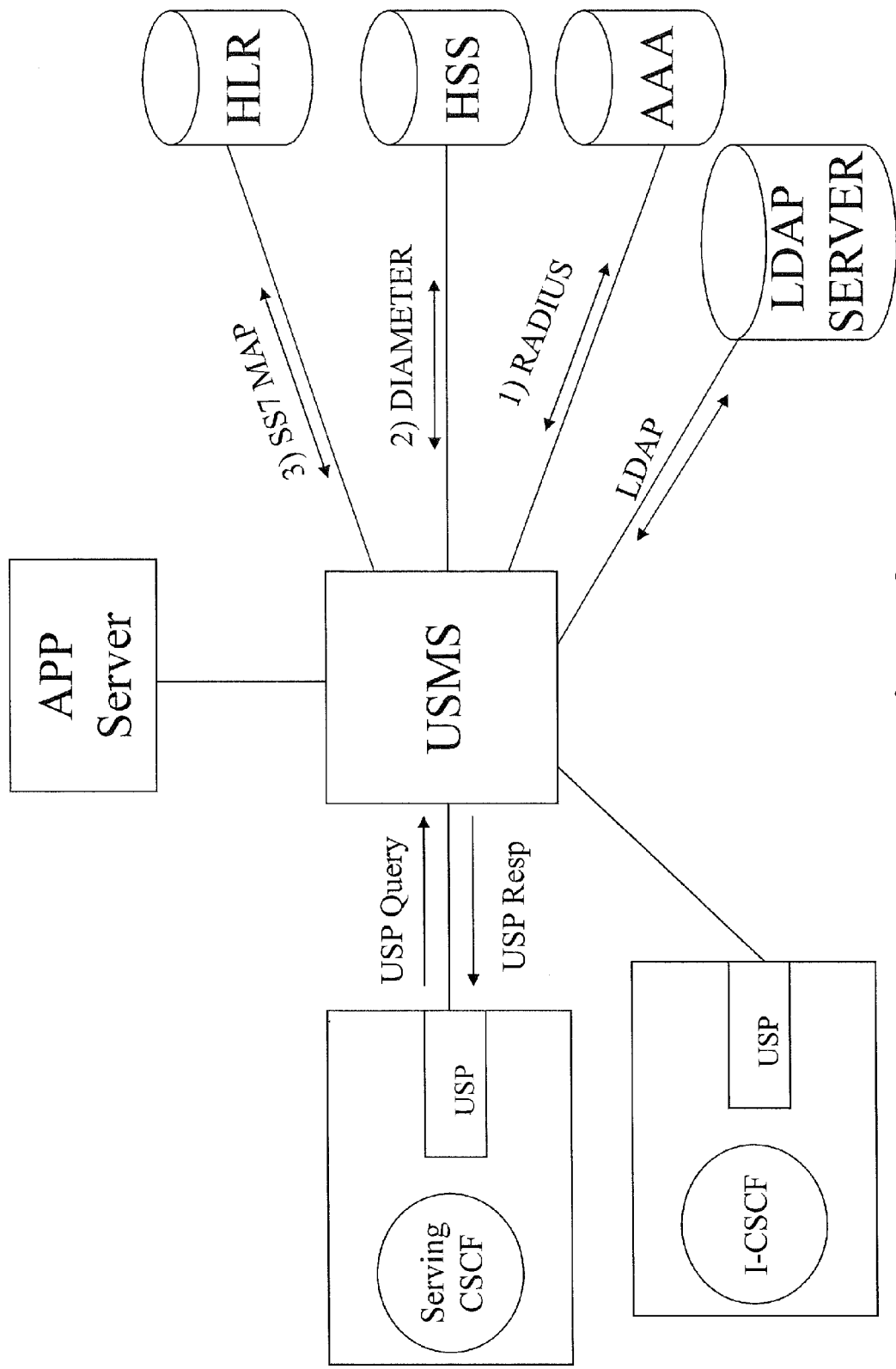
Figure 10:
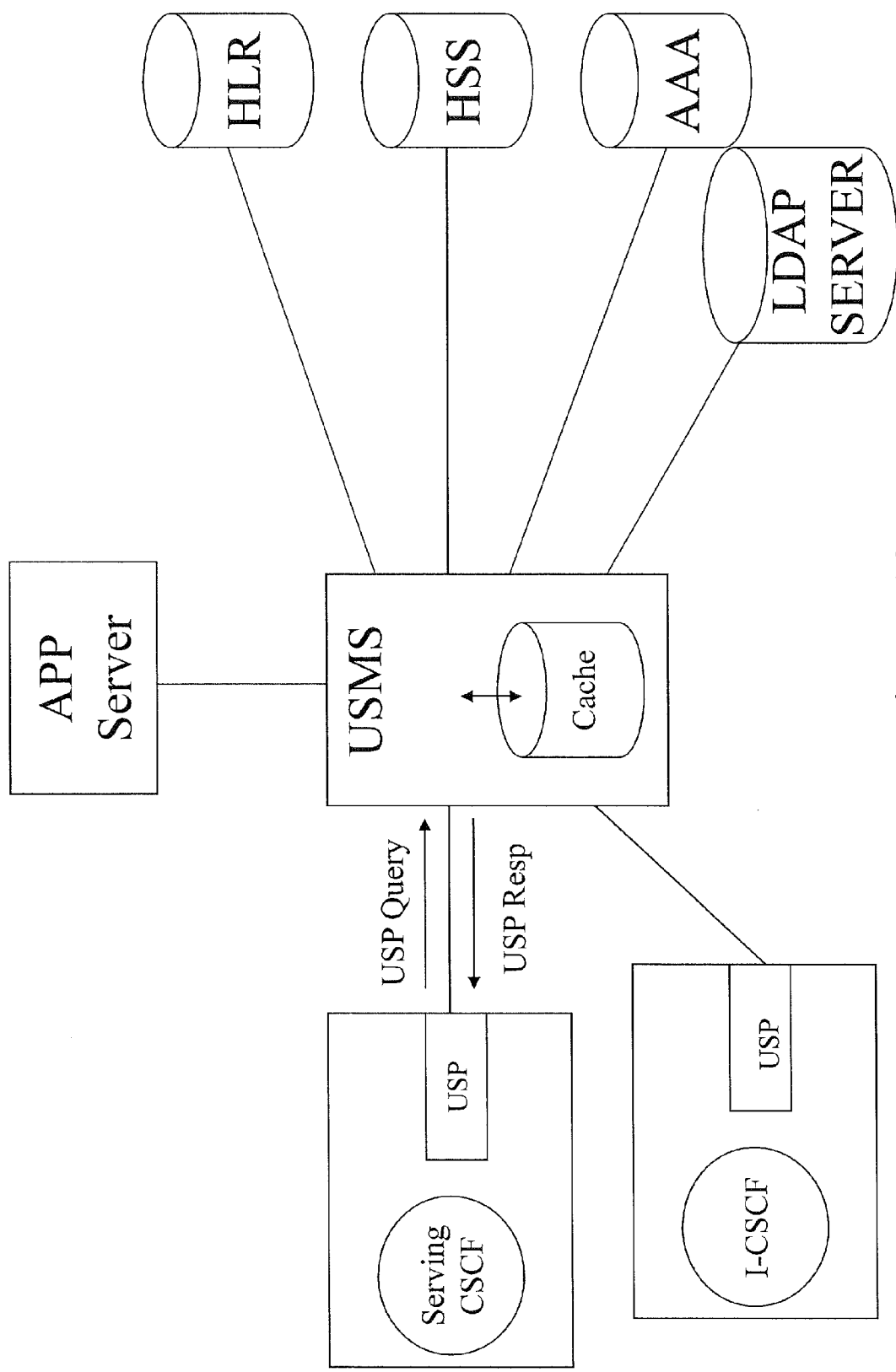
Figure 11:
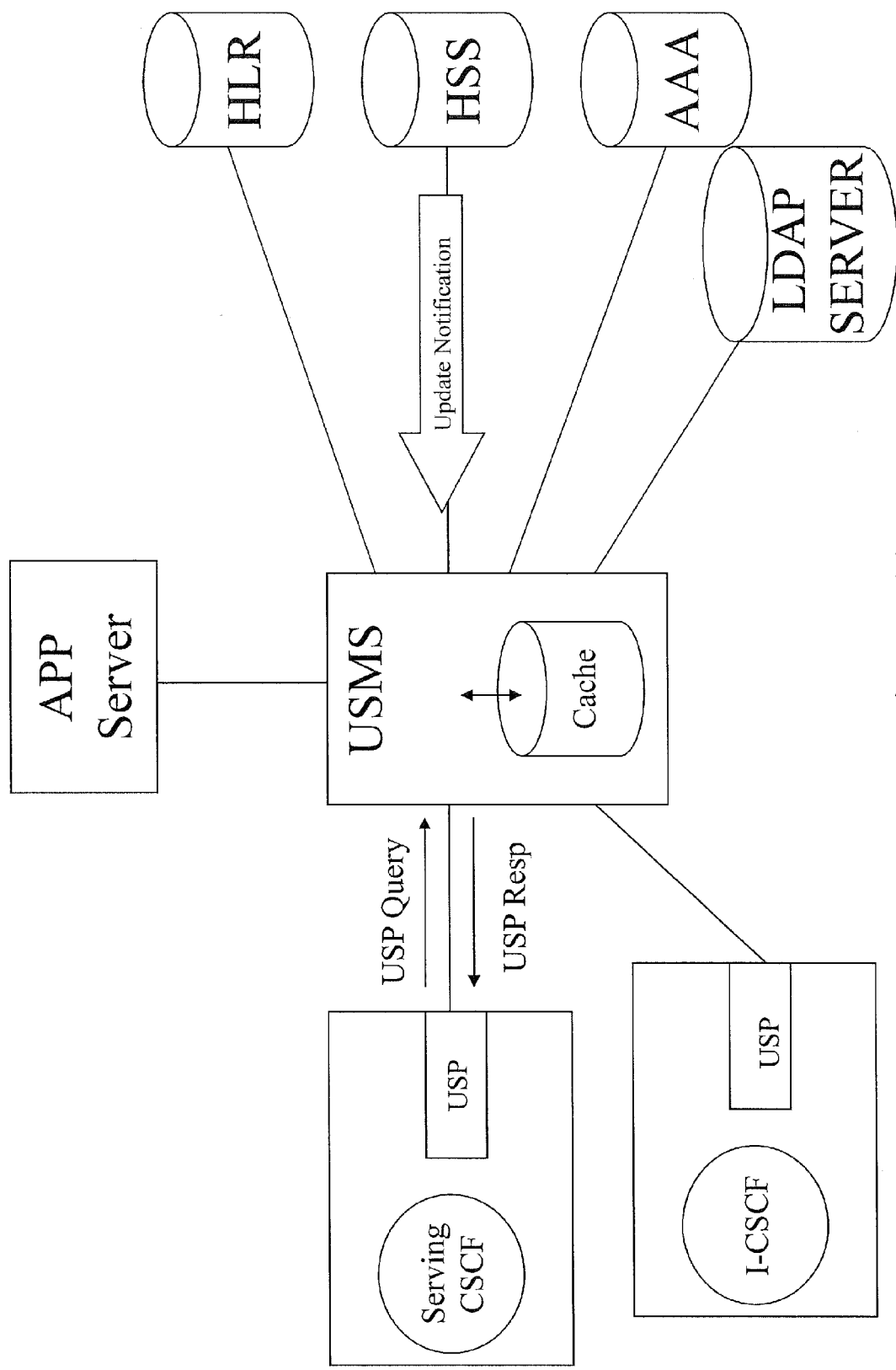
Figure 12:
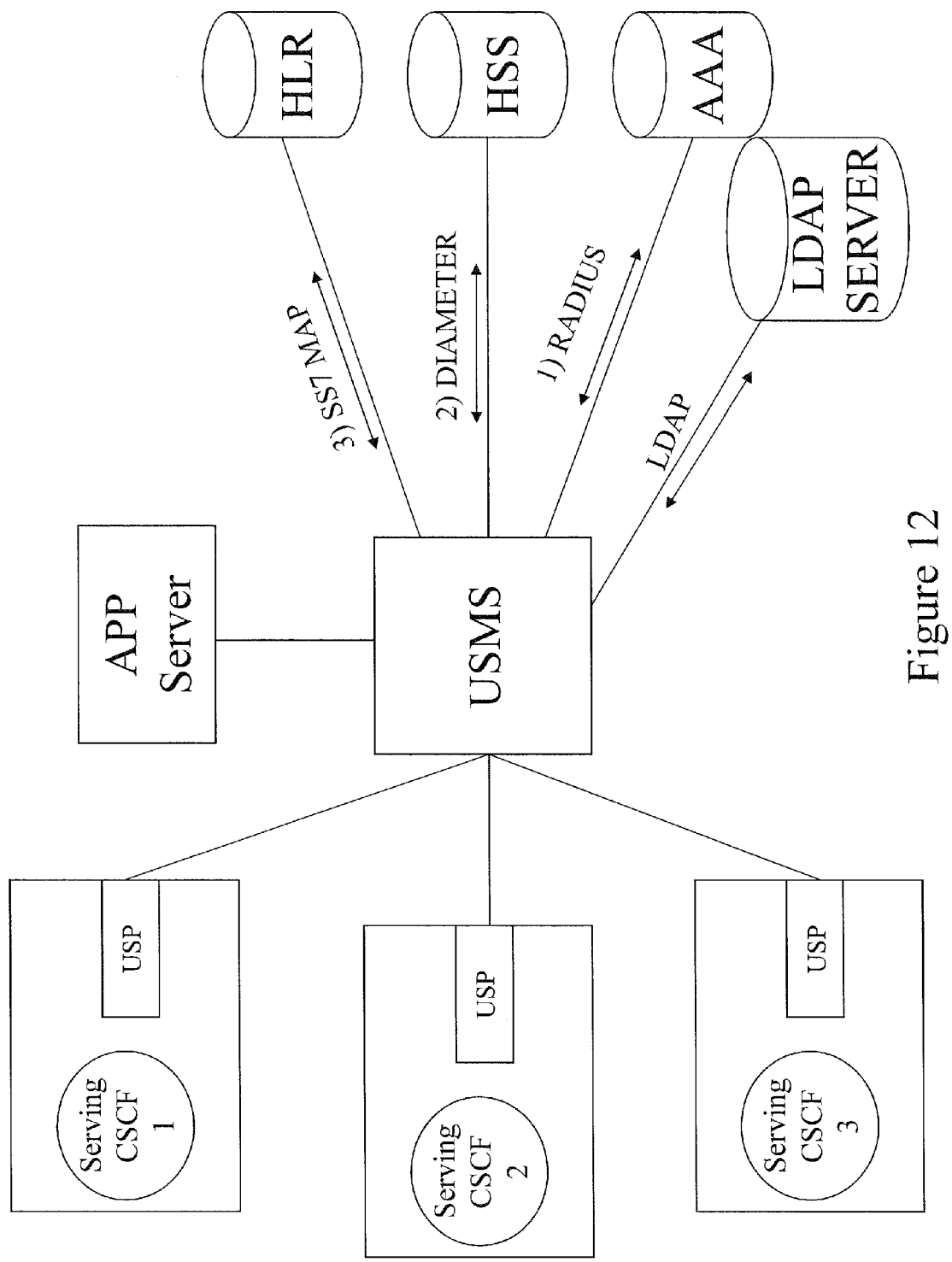

A network entity/function that is referred to herein as an abstracted profile server (APS) is disclosed. As illustrated in FIG. 9, according to one embodiment, an APS is adapted to communicate with a CSCF via one universal abstracted profile protocol (AP protocol) instead of the several native protocols described above. The APS includes the control logic and protocol support necessary to determine (1) which network entities should be queried, (2) in what sequence they should be queried, (3) and what protocol should be used for each query. In this manner, CSCF protocol support and control logic requirements may be greatly simplified. In one embodiment, an APS may include the data storage resources necessary to cache subscriber data received from previous database/application entity queries. Such data may be cached for some or all subscribers serviced by the APS. An APS could also be configured to "subscribe" to IMS subscriber profile change notifications that may be provided by an HSS or HSS-like entity in the network. Such notification messages may include the changed subscriber data, which would be used to update the appropriate cached subscriber data (FIG. 11). Alternatively, or in addition to such a subscription service, an APS may be adapted to periodically poll an HSS or HSS-like entity for subscriber profile updates/changes.

According to yet another embodiment, multiple CSCF entities may use a single APS function (see FIG. 12), as opposed to requiring each CSCF to implement and maintain the complex multi-protocol support and control logic functions.

Figure 13:
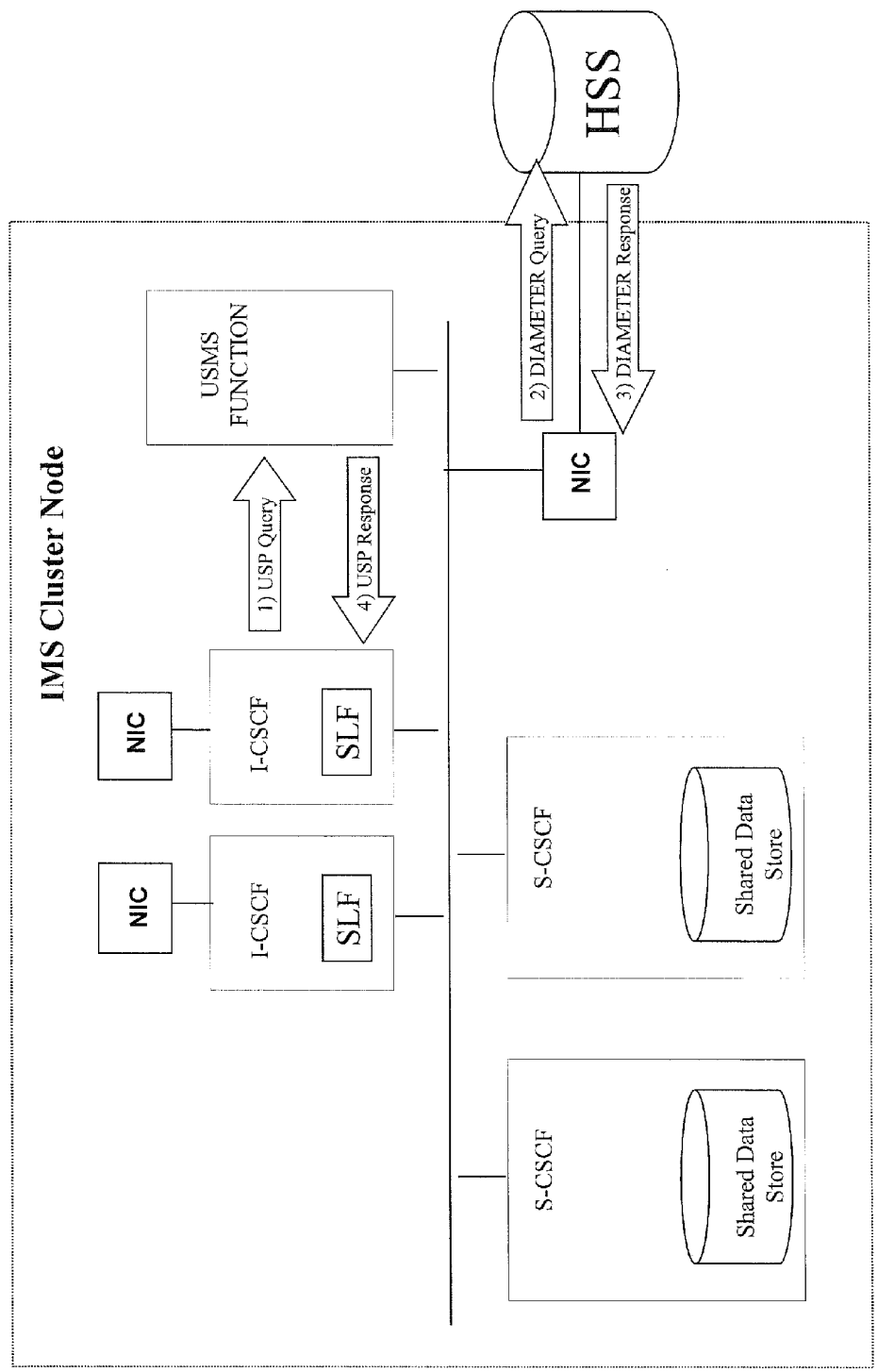
Figure 14:
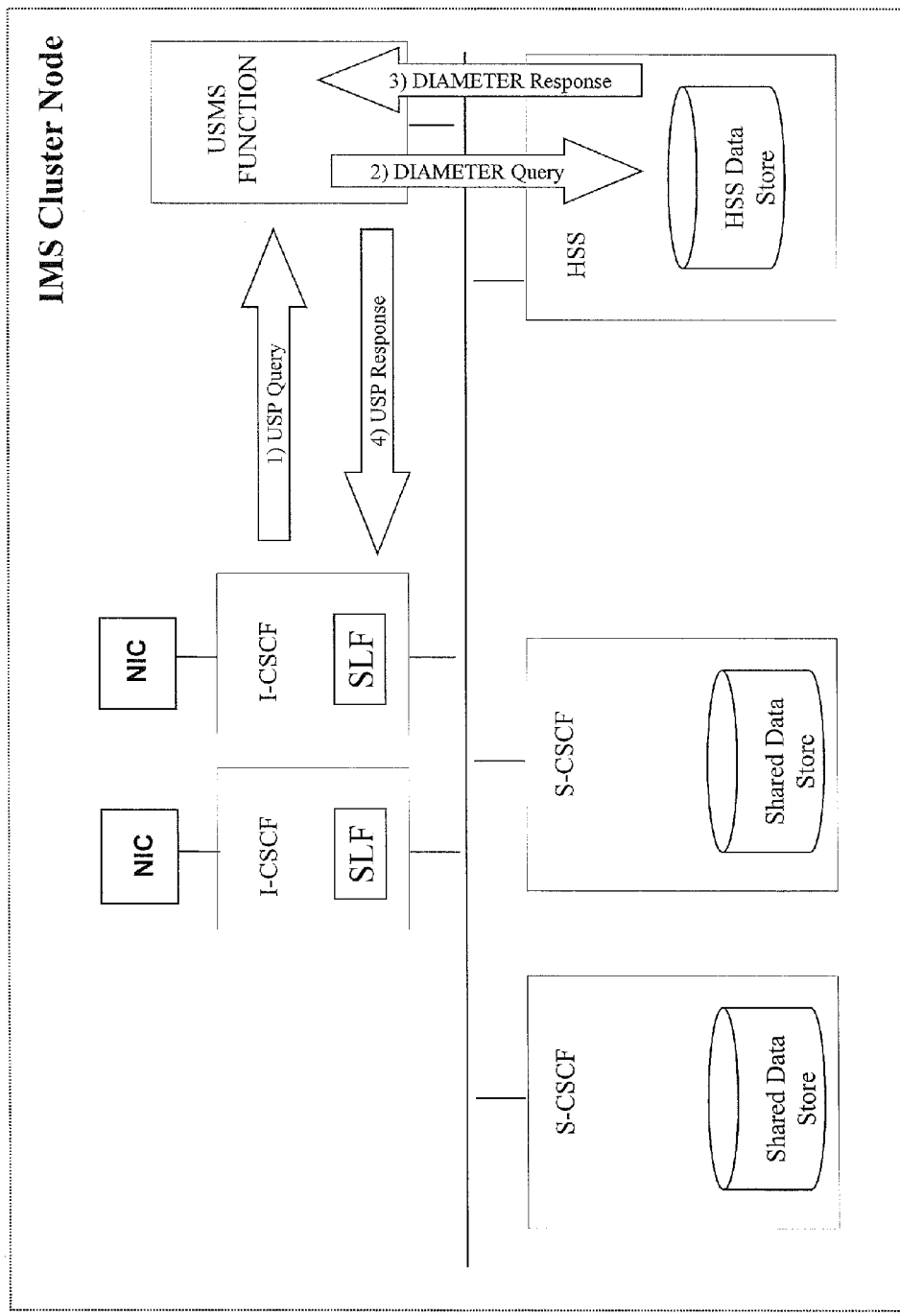

In other embodiments, illustrated in FIGS. 13 and 14, APS functionality may be incorporated into a distributed processing IMS cluster node. The IMS cluster node includes an internal communication bus or network to which a various printed circuit cards or processor modules are connected. As such, any card in the system may communicate with any other card in the system via the internal communication bus/network. The IMS cluster node includes one or more network interface cards (NICs) for communicating with external networks. NICs may be adapted to communicate with circuit switched and packet switched networks.

Also connected to the internal communication bus/network are processor modules that are adapted to provide Interrogating-CSCF functionality. In one embodiment, an I-CSCF module that includes a Subscription Locator Function (SLF) is adapted to receive a communication session-related registration message (e.g., SIP REGISTER). The SLF function is adapted to identify the HSS entity that contains a subscriber's location and subscription information. Services or information provided by an HSS entity may include, but are not limited to, Authentication, Authorization and Accounting (AAA), subscriber IP network mobility management information, subscriber IP network profile information, Equipment Identity Register (EIR) authorization, GSM/IS-41 cellular mobility management information, GSM/IS41 subscriber profile information, GSM/IS41 authentication, Presence information, etc. In one embodiment of the present invention, HSS functionality is included within the IMS cluster node as an HSS processor or module that is connected to the internal communication bus/network. Once a subscriber's HSS processor is identified, the subscriber's HSS processor may be queried to determine the identity of a Serving-CSCF entity (S-CSCF), to which a communication session-related registration message is then forwarded. In one embodiment of the present invention, S-CSCF functionality is included within the IMS cluster node as an S-CSCF processor or module that is connected to the internal communication bus/network.

With regard to querying of the HSS, it will be appreciated that in one embodiment, the HSS query could be initiated by the sending of an appropriate AP protocol query message from the I-CSCF processor to the APS function or processor. The APS function may alternatively be incorporated into the CSCF module or processor. The APS function is adapted to receive the AP protocol query message, formulate a related DIAMETER query message, and forward the DIAMETER query message to the appropriate HSS entity in the network (see FIG. 13) or the appropriate HSS processor within the IMS cluster node, as indicated in FIG. 14. It will be appreciated that an HSS, HLR, EIR, AuC, ENUM or other such network database application servers are generically referred to herein as database entities. As such, a database entity may be a network node, such as a stand-alone HLR service control point node, or the database entity may be a database application residing on a processor within an IMS cluster node, or other similar distributed processing system.

It will be understood that various details of the invention may be changed without departing from the scope of the invention. Furthermore, the foregoing description is for the purpose of illustration only, and not for the purpose of limitation.

What is claimed is:

1. A system for identifying an IP multimedia subsystem (IMS) cluster node adapted to serve a particular subscriber, the system comprising:
    an IMS cluster location node including a processor, the IMS cluster location node further including:
    an IMS cluster node location database embodied in a non-transitory computer readable medium and including entries corresponding to IMS subscriber identifiers and identifying IMS cluster nodes for serving subscribers corresponding to the IMS subscriber identifiers; and
    an IMS cluster node location function executable by the processor for receiving IMS registration messages and performing lookups in the IMS cluster node location database for identifying IMS cluster nodes among a plurality of IMS cluster nodes containing information for particular subscribers identified by the IMS registration messages and wherein the IMS cluster location node forwards the IMS registration messages to the identified IMS cluster nodes, wherein at least one of the IMS cluster nodes includes a call state control function (CSCF) and a home subscriber server (HSS) function.

2. The system of claim 1 wherein the IMS cluster node location database includes a first portion indexed by ranges of IMS subscriber identifiers.

3. The system of claim 2 wherein the IMS cluster node location database includes a second portion indexed by individual IMS subscriber identifiers.

4. The system of claim 1 comprising a number portability database, wherein the IMS cluster node location function is adapted to perform a lookup in the number portability database to determine whether a subscriber has been ported out of a network.

5. A system for providing IP multimedia subsystem (IMS) service to IMS subscribers, the system comprising:
   a first IMS cluster node including a processor and for providing IMS service to a first group of IMS subscribers; and
   a second IMS cluster node including a processor and for providing IMS service to a second group of IMS subscribers, wherein the first IMS cluster node receives IMS registration messages from a proxy call state control function (P-CSCF) for at least one of the messages, determines, using subscriber information in the message that a corresponding subscriber's information is not contained in the first IMS cluster node but instead is contained in the second IMS cluster node and forwards the message to the second IMS cluster node, wherein at least one of the IMS cluster nodes includes a call state control function (CSCF) and a home subscriber server (HSS) function.

6. The system of claim 5 wherein the first IMS cluster node includes a service location function (SLF) for identifying the second IMS cluster node as the serving node for a received IMS message concerning a subscriber in the second group.

7. The system of claim 5 comprising a third IMS cluster node adapted to serve a third group of IMS subscribers, wherein, in response to receiving an IMS message concerning a subscriber in the third group, the first IMS cluster node is adapted to forward the IMS message to the second IMS cluster node and the second IMS cluster node is adapted to forward the query message to the third IMS cluster node.

8. A method for communicating IP multimedia subsystem (IMS) information between IMS functions, the method comprising:
   an IMS cluster node including a processor and a shared memory:
   receiving an IMS registration message;
   requesting IMS subscription information from a home subscriber service (HSS) function within the IMS cluster node via shared memory of the IMS cluster node; and
   providing the requested IMS subscription information via the shared memory of the IMS cluster node, wherein at least one of the IMS cluster nodes includes a call state control function (CSCF) and a home subscriber server (HSS) function.

9. A method for locating an IMS cluster node among a plurality of IMS cluster nodes for processing an IMS message, the method comprising:
   at an IMS cluster location node including a processor;
   receiving an IMS registration message requiring processing by an IMS cluster node;
   performing, by the processor, a lookup in at least one database embodied in a non-transitory computer readable medium and identifying an IMS cluster node of a plurality of IMS cluster nodes for processing the IMS message; and
   forwarding the IMS registration message to the identified IMS cluster node, wherein at least one of the IMS cluster nodes includes a call state control function (CSCF) and a home subscriber server (HSS) function.

10. The method of claim 9 wherein performing a lookup in at least one database includes performing a lookup in a first database indexed by individual IMS subscriber identifiers to locate an IMS cluster node for processing the IMS message.

11. The method of claim 10 wherein performing a lookup in at least one database comprises, in response to failing to locate a matching entry in the first database, performing a lookup in a second database indexed by ranges of IMS subscriber identifiers.

12. A computer program product comprising computer executable instructions embodied in a non-transitory computer readable medium for controlling a processor of a computer to perform steps comprising:
   at an IP multimedia subsystem IMS cluster node including a shared memory:
   receiving an IMS registration message;
   requesting IMS subscription information from a home subscriber server (HSS) function within the IMS cluster node via the shared memory of the IMS cluster node; and
   providing the requested IMS subscription information via the shared memory of the IMS cluster node, wherein at least one of the IMS cluster nodes includes a call state control function (CSCF) and a home subscriber server (HSS) function.

13. A computer program product comprising computer executable instructions embodied in a non-transitory computer readable medium for controlling a processor of a computer to perform steps comprising:
   at an IP multimedia subsystem (IMS) cluster location node:
   receiving an IMS message requiring processing by an IMS cluster node;
   performing a lookup in at least one database and identifying an IMS cluster node of a plurality of IMS cluster nodes for processing the IMS registration message; and
   forwarding the message to the identified IMS cluster node, wherein at least one of the IMS cluster nodes includes a call state control function (CSCF) and a home subscriber server (HSS) function.

* * * * *